(12) United States Patent
Rahman et al.

(10) Patent No.: US 11,742,918 B2
(45) Date of Patent: Aug. 29, 2023

(54) METHOD AND APPARATUS FOR MULTIPLEXING AND OMITTING CHANNEL STATE INFORMATION

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/447,810

(22) Filed: Sep. 15, 2021

(65) Prior Publication Data

US 2022/0006502 A1 Jan. 6, 2022

Related U.S. Application Data

(63) Continuation of application No. 16/803,924, filed on Feb. 27, 2020, now Pat. No. 11,128,362.

(Continued)

(51) Int. Cl.
*H04B 7/06* (2006.01)
*H04B 7/0417* (2017.01)
*H04W 72/21* (2023.01)

(52) U.S. Cl.
CPC ......... *H04B 7/0626* (2013.01); *H04B 7/0417* (2013.01); *H04B 7/0634* (2013.01); *H04W 72/21* (2023.01)

(58) Field of Classification Search
CPC .. H04B 7/0626; H04B 7/0417; H04B 7/0634; H04W 72/0413
See application file for complete search history.

(56) References Cited

U.S. PATENT DOCUMENTS 10,341,072 B2 * 7/2019 Wei ............... H04W 72/0413
2018/0198561 A1 * 7/2018 Tsai ..................... H03M 13/13
(Continued)

FOREIGN PATENT DOCUMENTS

CN 103181097 A 6/2013
CN 108575117 A 9/2018
(Continued)

OTHER PUBLICATIONS

China National Intellectual Property Administration, Office Action dated Feb. 21, 2022 regarding Application No. 202080007236.1, 9 pages.

(Continued)

*Primary Examiner* — Jaison Joseph

(57) ABSTRACT

A method for operating a UE for CSI reporting in a wireless communication system is provided. The method comprises receiving, from a BS, configuration information for a CSI report, the CSI report comprising a first CSI part and a second CSI part, the second CSI part including a total of $K^{NZ}$ non-zero coefficients across $\upsilon$ layers, determining a priority value for each of the total of $K^{NZ}$ non-zero coefficients, partitioning the second CSI part into Group 0, Group 1, and Group 2 such that, based on the determined priority values of the total of $K^{NZ}$ non-zero coefficients, indicators to non-zero coefficients having higher priority values are included in Group 1 and indicators to non-zero coefficients having lower priority values are included in Group 2, and transmitting, to the BS over an uplink (UL) channel, UL control information (UCI) including Group 0 or (Group 0, Group 1) or (Group 0, Group 1, Group 2) of the second CSI part.

12 Claims, 19 Drawing Sheets

Related U.S. Application Data

(60) Provisional application No. 62/892,866, filed on Aug. 28, 2019, provisional application No. 62/834,577, filed on Apr. 16, 2019, provisional application No. 62/816,428, filed on Mar. 11, 2019.

(56) References Cited

U.S. PATENT DOCUMENTS

| | | | | |
|---|---|---|---|---|
| 2020/0403676 | A1* | 12/2020 | Kakishima | H04B 7/0639 |
| 2021/0051508 | A1* | 2/2021 | Chung | H04L 5/0048 |
| 2021/0099211 | A1* | 4/2021 | Rahman | H04B 7/0626 |
| 2021/0143886 | A1* | 5/2021 | Chung | H04B 7/0639 |
| 2022/0149908 | A1* | 5/2022 | Gao | H04B 7/0645 |
| 2022/0239360 | A1* | 7/2022 | Faxér | H04B 7/0658 |
| 2022/0303999 | A1* | 9/2022 | Chung | H04W 72/0453 |

FOREIGN PATENT DOCUMENTS

| | | | |
|---|---|---|---|
| CN | 201811544609 | * | 6/2020 |
| KR | 1020180088522 | * | 7/2018 |
| WO | 2019039843 A1 | | 2/2019 |

OTHER PUBLICATIONS

Supplementary European Search Report dated Nov. 10, 2021, in connection with European Application No. 20769732.7, 16 pages.
CATT, "Discussions on Type II CSI enhancement," R1-1902018, 3GPP TSG RAN WG1 Meeting #96, Athens, Greece, Feb. 25-Mar. 1, 2019, 16 pages.
"LTE; Evolved Universal Terrestrial Radio Access (E-UTRA); Physical channels and modulation (3GPP TS 36.211 version 15.4.0 Release 15)", ETSI TS 136 211 V15.4.0, May 2019, 242 pages.
"LTE; Evolved Universal Terrestrial Radio Access (E-UTRA); Multiplexing and channel coding (3GPP TS 36.212 version 15.4.0 Release 15)", ETSI TS 136 212 V15.4.0, Apr. 2019, 249 pages.
"LTE; Evolved Universal Terrestrial Radio Access (E-UTRA); Physical layer procedures (3GPP TS 36.213 version 15.4.0 Release 15)", ETSI TS 136 213 V15.4.0, May 2019, 551 pages.
"LTE; Evolved Universal Terrestrial Radio Access (E-UTRA); Medium Access Control (MAC) protocol specification (3GPP TS 36.321 version 15.4.0 Release 15)", ETSI TS 136 321 V15.4.0, Apr. 2019, 133 pages.
"LTE; Evolved Universal Terrestrial Radio Access (E-UTRA); Radio Resource Control (RRC); Protocol specification (3GPP TS 36.331 version 15.4.0 Release 15)", ETSI TS 136 331 V15.4.0, Apr. 2019, 929 pages.
"3rd Generation Partnership Project; Technical Specification Group Services and System Aspects; Feasibility Study on New Services and Markets Technology Enablers; Stage 1 (Release 14)", 3GPP TR 22.891 V14.2.0, Sep. 2016, 95 pages.
"3rd Generation Partnership Project; Technical Specification Group Radio Access Network; NR; Multiplexing and channel coding (Release 15)", 3GPP TS 38.212 V15.4.0, Dec. 2018, 100 pages.
"3rd Generation Partnership Project; Technical Specification Group Radio Access Network; NR; Physical layer procedures for data (Release 15)", 3GPP TS 38.214 V15.4.0, Dec. 2018, 102 pages.
"3rd Generation Partnership Project; Technical Specification Group Radio Access Network; NR; Physical layer procedures for data (Release 15)", 3GPP TS 38.213 V15.4.0, Dec. 2018, 104 pages.
International Search Report and Written Opinion of the International Searching Authority in connection with International Application No. PCT/KR2020/003373 dated Jun. 26, 2020, 8 pages.
Qualcomm Incorporated, "CSI Enhancement for MU-MIMO Support," R1-1903042, 3GPP TSG RAN WG1 Meeting #96, Athens, Greece, Feb. 25-Mar. 1, 2019, 15 pages.
Vivo, "Discussion on type II CSI compression and feedback parameters," R1-1900136, 3GPP TSG RAN WG1 Ad-Hoc Meeting 1901, Taipei, Taiwan, Jan. 21-25, 2019, 6 pages.
Vivo, "Further discussion on type II CSI compression and feedback" R1-1901701, 3GPP TSG RAN WG1 Meeting #96, Athens, Greece, Feb. 25-Mar. 1, 2019, 7 pages.
ZTE, "CSI Enhancement tor MU-MIMO Support," R1-1901633, 3GPP TSG RAN WG1 Meeting #96, Athens, Greece, Feb. 25-Mar. 1, 2019, 15 pages.
Korean Intellectual Property Office, Office Action dated Feb. 10, 2023 regarding Application No. 10-2021-7029498, 10 pages.

* cited by examiner

METHOD AND APPARATUS FOR MULTIPLEXING AND OMITTING CHANNEL STATE INFORMATION

CROSS-REFERENCE TO RELATED APPLICATION(S) AND CLAIM OF PRIORITY

This application is a continuation of U.S. patent application Ser. No. 16/803,924, filed Feb. 27, 2020, which claims priority to U.S. Provisional Patent Application No. 62/816,428, filed Mar. 11, 2019, U.S. Provisional Patent Application No. 62/834,577, filed Apr. 16, 2019, and U.S. Provisional Patent Application No. 62/892,866, filed Aug. 28, 2019. The content of the above-identified patent documents is incorporated herein by reference.

TECHNICAL FIELD

The present disclosure relates generally to wireless communication systems and more specifically to channel state information (CSI) reporting and multiplexing.

BACKGROUND

Understanding and correctly estimating the channel between a user equipment (UE) and a base station (BS) (e.g., gNode B (gNB)) is important for efficient and effective wireless communication. In order to correctly estimate the DL channel conditions, the gNB may transmit a reference signal, e.g., CSI-RS, to the UE for DL channel measurement, and the UE may report (e.g., feedback) information about channel measurement, e.g., CSI, to the gNB. With this DL channel measurement, the gNB is able to select appropriate communication parameters to efficiently and effectively perform wireless data communication with the UE.

SUMMARY

Embodiments of the present disclosure provide methods and apparatuses for CSI reporting and multiplexing in a wireless communication system.

In one embodiment, a UE for CSI reporting in a wireless communication system is provided. The UE includes a transceiver configured to receive, from a base station (BS), configuration information for a CSI report. The UE further includes a processor operably connected to the transceiver. The processor is configured to determine the CSI report comprising a first CSI part and a second CSI part, the second CSI part including a total of $K^{NZ}$ non-zero coefficients across $\upsilon$ layers, wherein $\upsilon \geq 1$ is a rank value. The processor is further configured to determine a priority value for each of the total of $K^{NZ}$ non-zero coefficients, and partition the second CSI part into Group 0, Group 1, and Group 2 such that, based on the determined priority values of the total of $K^{NZ}$ non-zero coefficients, indicators to non-zero coefficients having higher priority values are included in Group 1 and indicators to non-zero coefficients having lower priority values are included in Group 2, wherein an indicator to a non-zero coefficient includes an amplitude coefficient indicator and a phase coefficient indicator that indicate an amplitude and a phase of the non-zero coefficient, respectively. The transceiver is further configured to transmit, to the BS over an uplink (UL) channel, UL control information (UCI) including Group 0 or (Group 0, Group 1) or (Group 0, Group 1, Group 2) of the second CSI part based on a resource allocation for the UCI transmission.

In another embodiment, a BS in a wireless communication system is provided. The BS includes a processor configured to generate CSI configuration information. The BS further includes a transceiver operably connected to the processor. The transceiver is configured to transmit, to a UE, the CSI configuration information for a CSI report, where the CSI report comprises a first CSI part and a second CSI part, and receive, from the UE over an uplink (UL) channel, UL control information (UCI) including Group 0 or (Group 0, Group 1) or (Group 0, Group 1, Group 2) of the second CSI part based on a resource allocation for the UCI transmission. The second CSI part includes a total of $K^{NZ}$ non-zero coefficients across $\upsilon$ layers, each non-zero coefficient having a priority value, wherein $\upsilon \geq 1$ is a rank value. The second CSI part is partitioned into Group 0, Group 1, and Group 2 such that, based on priority values of each of the total of $K^{NZ}$ non-zero coefficients, indicators to non-zero coefficients having higher priority values are included in Group 1 and indicators to non-zero coefficients having lower priority values are included in Group 2, wherein an indicator to a non-zero coefficient includes an amplitude coefficient indicator and a phase coefficient indicator that indicate an amplitude and a phase of the non-zero coefficient, respectively, and wherein a number of indicators included in Group 1 and Group 2 is $$\left\lceil \frac{K^{NZ}}{2} \right\rceil \text{ and } \left\lfloor \frac{K^{NZ}}{2} \right\rfloor,$$

respectively, where $\lceil\ \rceil$ is a ceiling function and $\lfloor\ \rfloor$ is a flooring function.

In yet another embodiment, a method for operating a UE for CSI reporting in a wireless communication system is provided. The method comprises receiving, from a BS, configuration information for a CSI report, determining the CSI report comprising a first CSI part and a second CSI part, the second CSI part including a total of $K^{NZ}$ non-zero coefficients across $\upsilon$ layers, wherein $\upsilon \geq 1$ is a rank value, determining a priority value for each of the total of $K^{NZ}$ non-zero coefficients, partitioning the second CSI part into Group 0, Group 1, and Group 2 such that, based on the determined priority values of the total of $K^{NZ}$ non-zero coefficients, indicators to non-zero coefficients having higher priority values are included in Group 1 and indicators to non-zero coefficients having lower priority values are included in Group 2, and transmitting, to the BS over an uplink (UL) channel, UL control information (UCI) including Group 0 or (Group 0, Group 1) or (Group 0, Group 1, Group 2) of the second CSI part based on a resource allocation for the UCI transmission, wherein an indicator to a non-zero coefficient includes an amplitude coefficient indicator and a phase coefficient indicator that indicate an amplitude and a phase of the non-zero coefficient, respectively, and wherein a number of indicators included in Group 1 and Group 2 is $$\left\lceil \frac{K^{NZ}}{2} \right\rceil \text{ and } \left\lfloor \frac{K^{NZ}}{2} \right\rfloor,$$

respectively, where $\lceil\ \rceil$ is a ceiling function and $\lfloor\ \rfloor$ is a flooring function.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
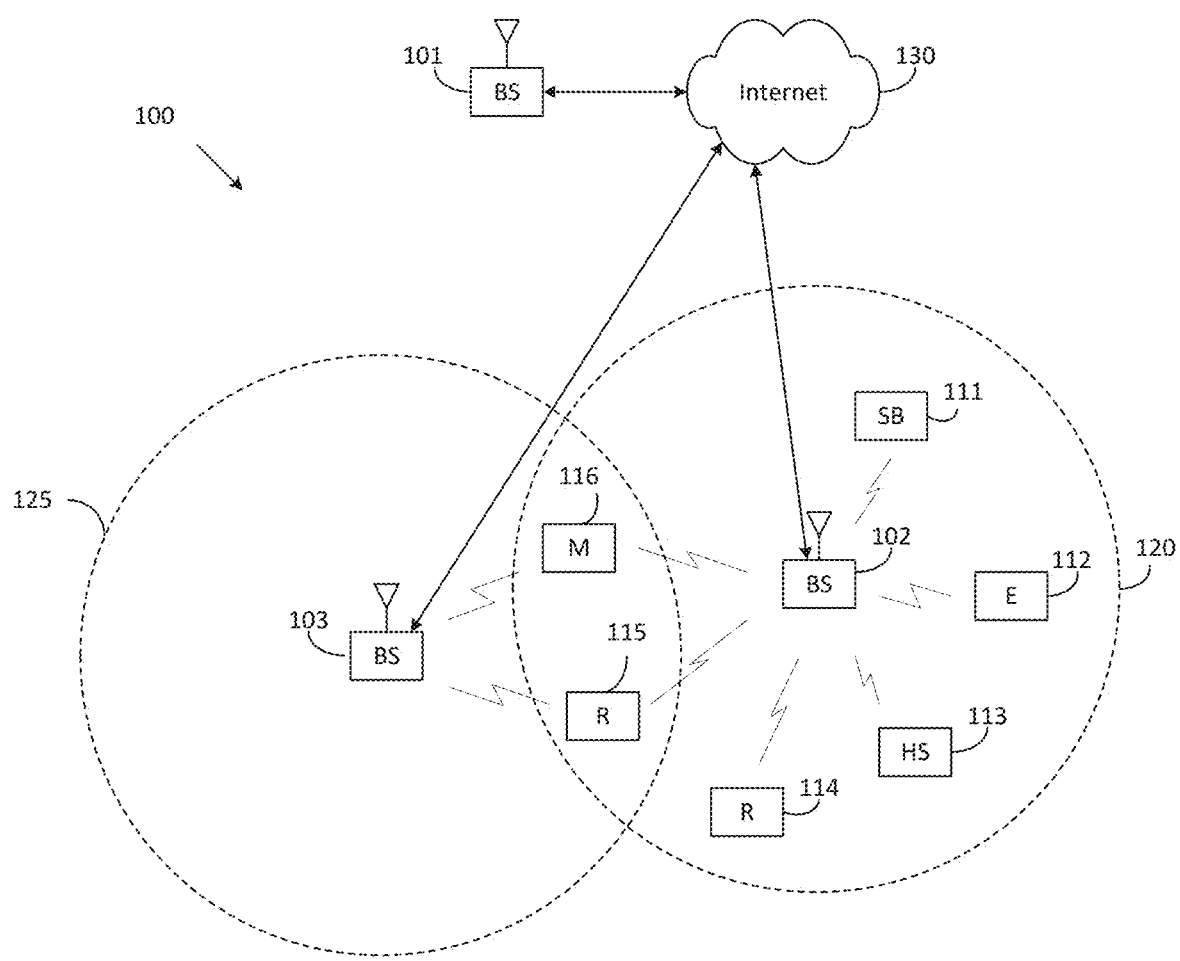
FIG. 1 illustrates an example wireless network according to embodiments of the present disclosure.

FIG. 1 through FIG. 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v16.0.0, "E-UTRA, Physical channels and modulation;" 3GPP TS 36.212 v16.0.0, "E-UTRA, Multiplexing and Channel coding;" 3GPP TS 36.213 v16.0.0, "E-UTRA, Physical Layer Procedures;" 3GPP TS 36.321 v16.0.0, "E-UTRA, Medium Access Control (MAC) protocol specification;" 3GPP TS 36.331 v16.0.0, "E-UTRA, Radio Resource Control (RRC) protocol specification;" 3GPP TR 22.891 v14.2.0; 3GPP TS 38.211 v16.0.0, "E-UTRA, NR, Physical channels and modulation;" 3GPP TS 38.213 v16.0.0, "E-UTRA, NR, Physical Layer Procedures for control;" 3GPP TS 38.214 v16.0.0, "E-UTRA, NR, Physical layer procedures for data;" and 3GPP TS 38.212 v16.0.0, "E-UTRA, NR, Multiplexing and channel coding."

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
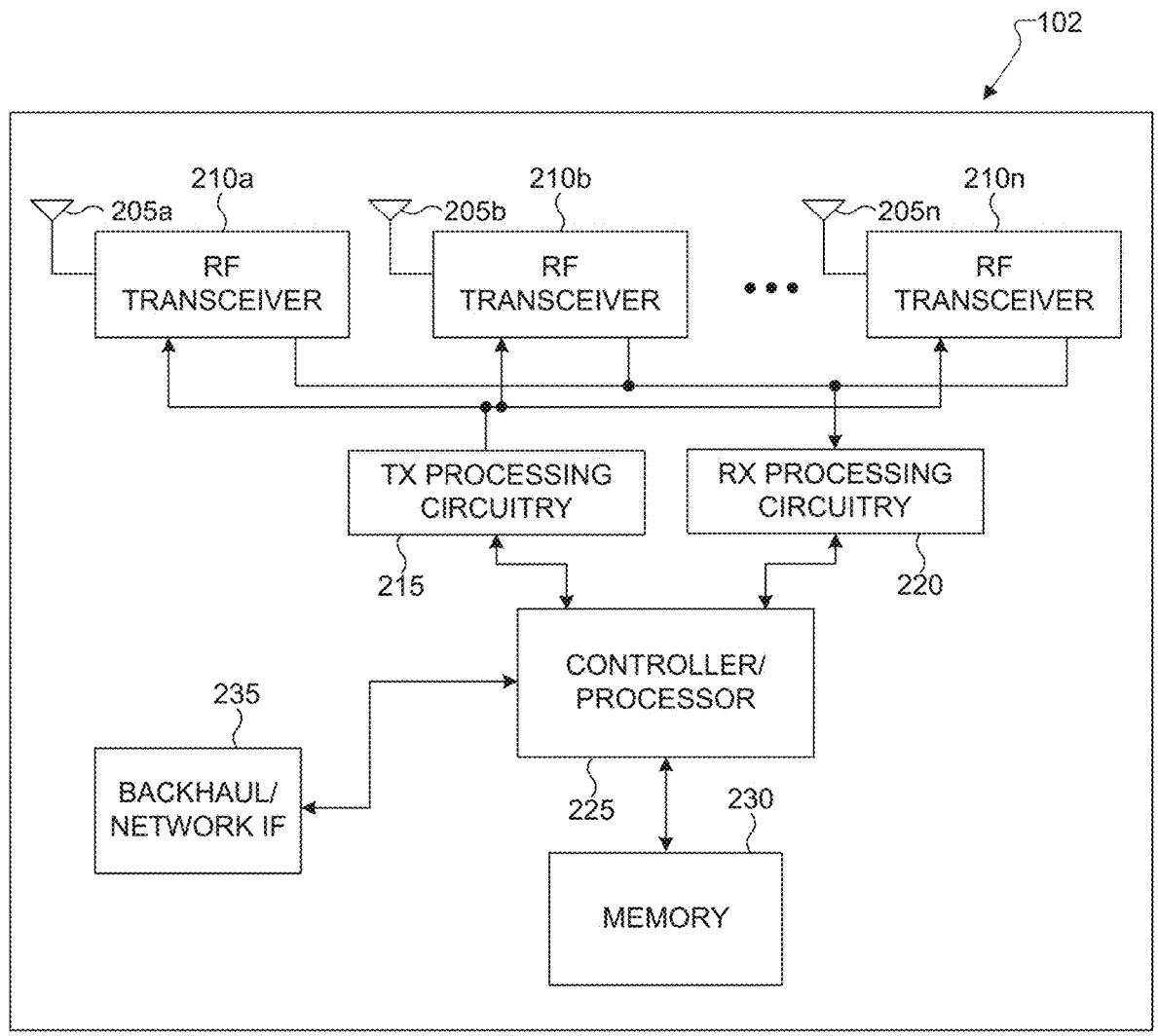
FIG. 2 illustrates an example gNB according to embodiments of the present disclosure.
Figure 3:
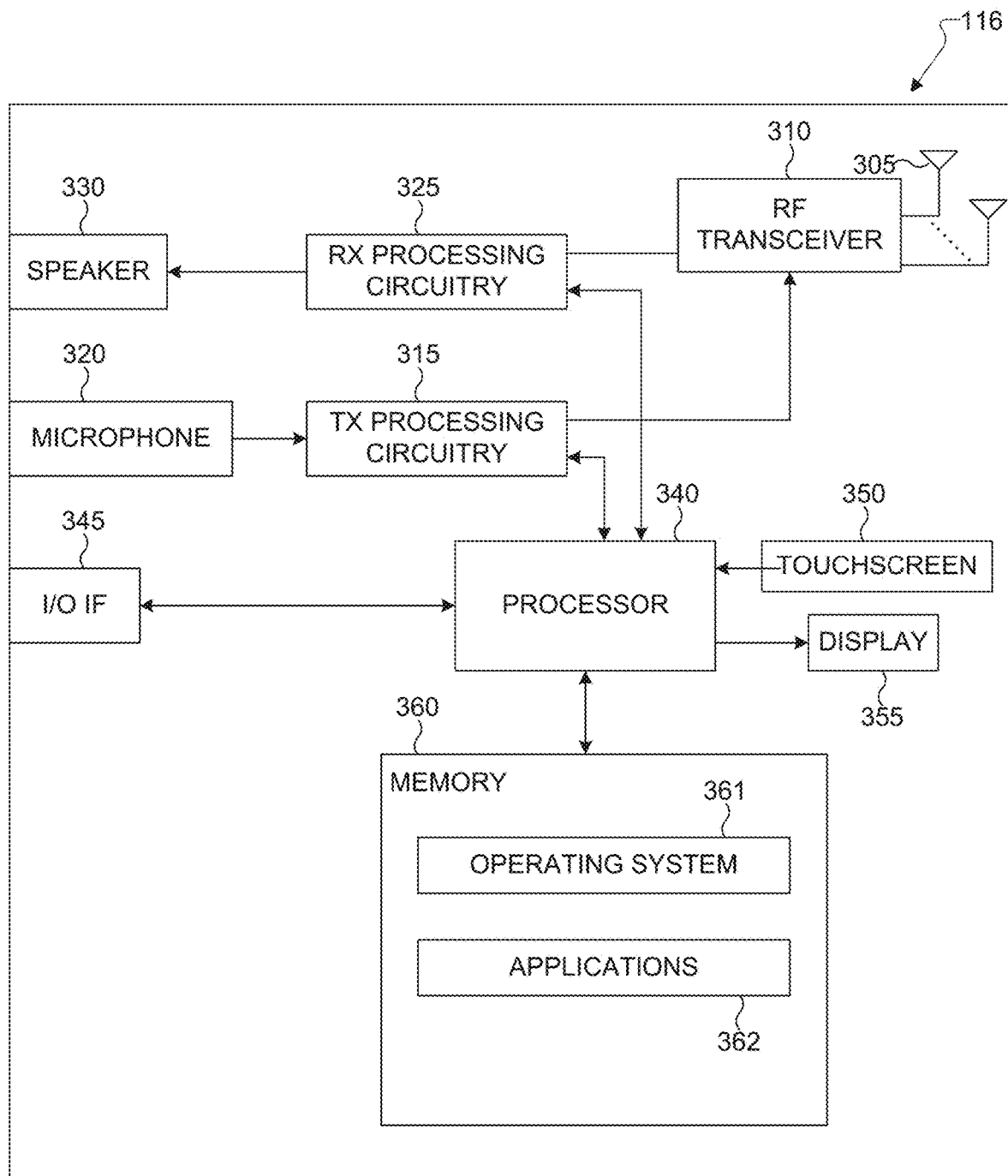
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another, or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for CSI reporting and multiplexing in a wireless communication system. In certain embodiments, and one or more of the gNBs 101-103 includes circuitry, programing, or a combination thereof, for CSI acquisition in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI feedback on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
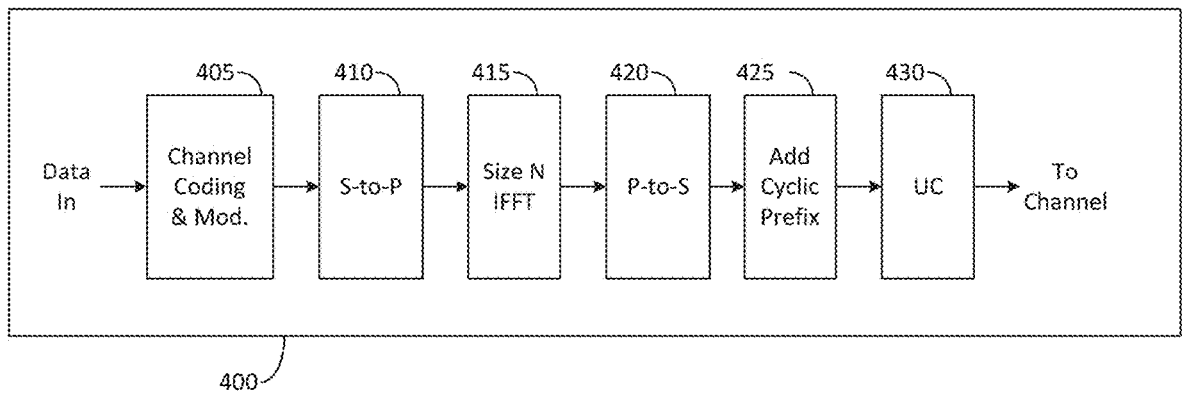
FIG. 4A illustrates a high-level diagram of an orthogonal frequency division multiple access transmit path according to embodiments of the present disclosure.
Figure 4B:
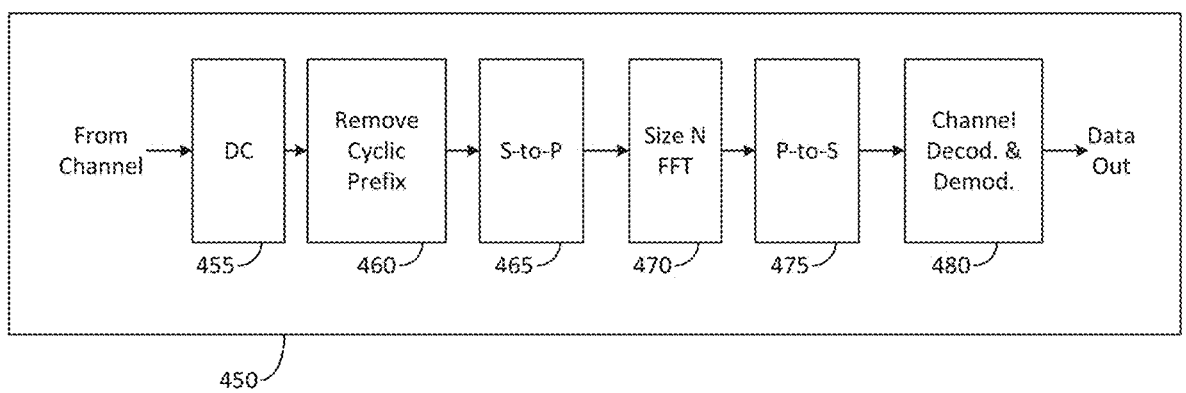
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIB s that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRB s). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2\cdot(N_{symb}^{UL}-1)-N_{SRS}$, where $N_{SRS}=1$ if a last subframe symbol is used to transmit SRS and $N_{SRS}=0$ otherwise.

Figure 5:
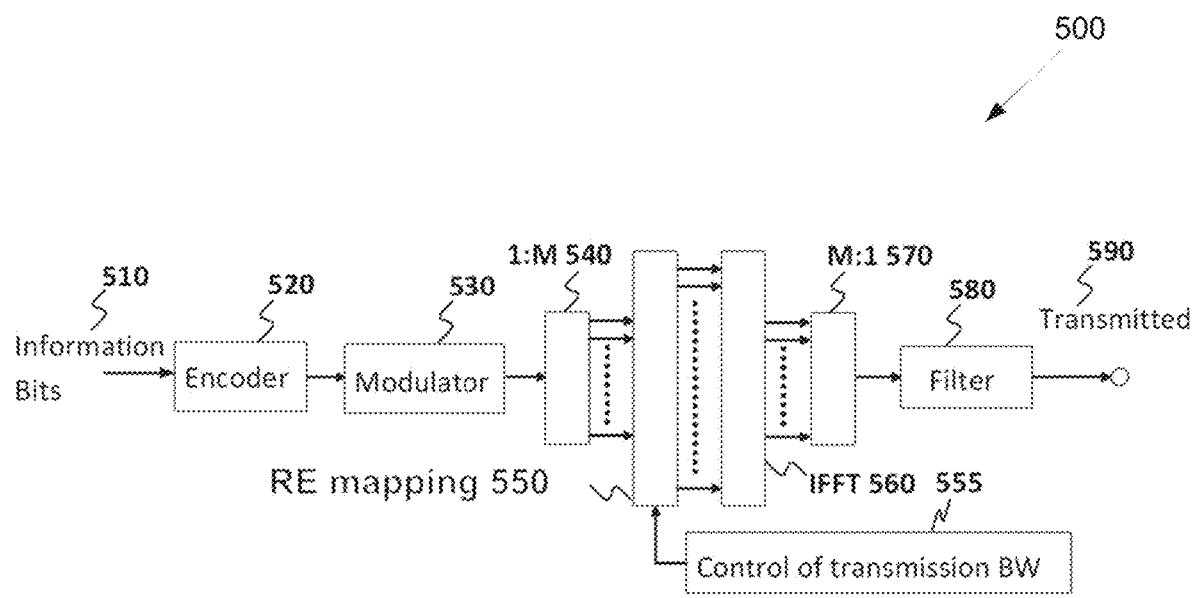
FIG. 5 illustrates an example of a transmitter block diagram for a PDSCH in a subframe according to embodiments of the present disclosure.

FIG. 5 illustrates an example transmitter block diagram 500 for a PDSCH in a subframe according to embodiments of the present disclosure. The embodiment of the block diagram of the transmitter 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
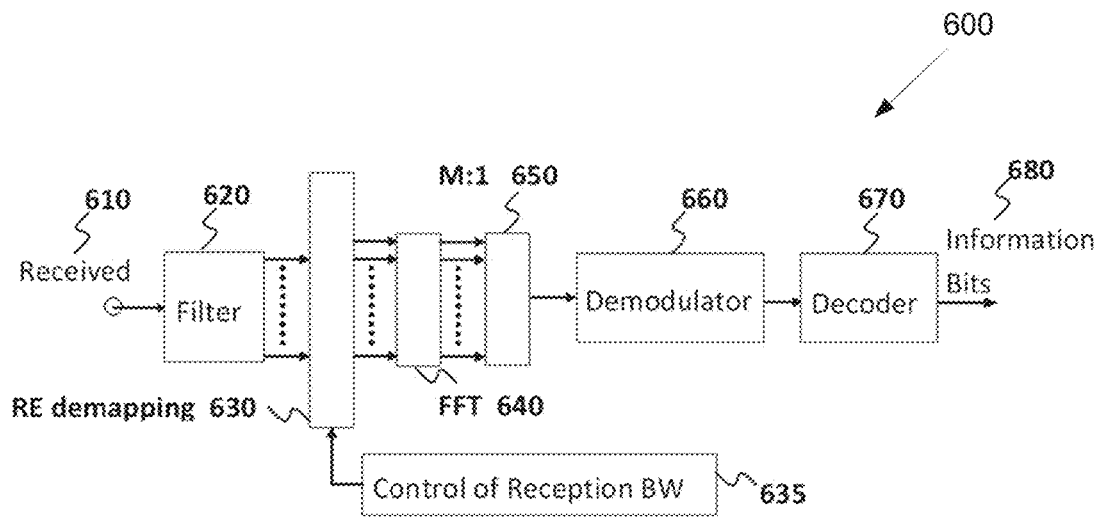
FIG. 6 illustrates an example of a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
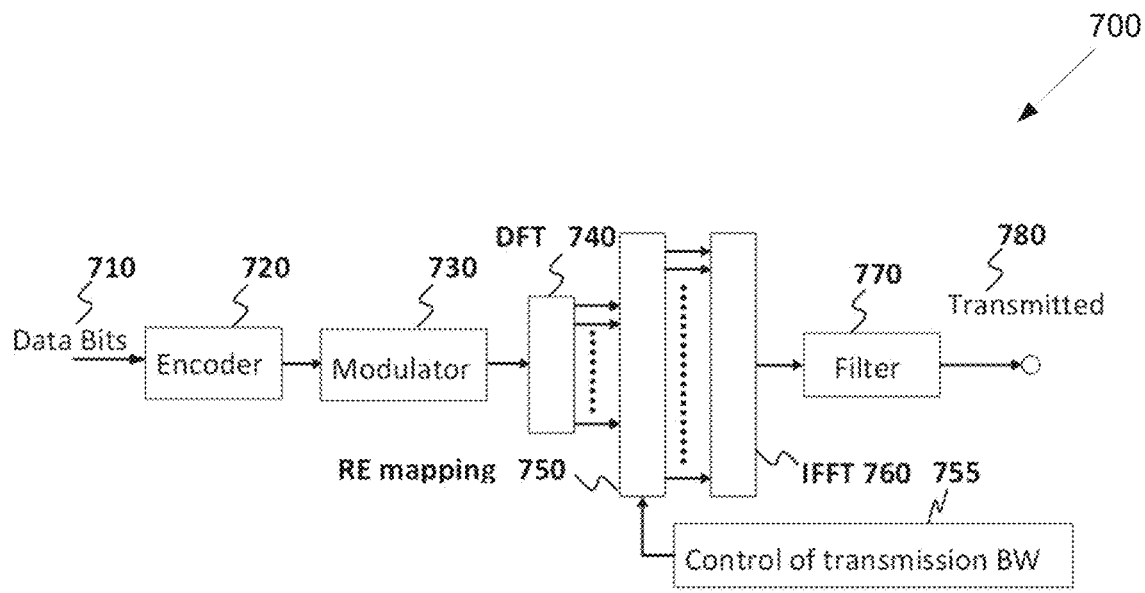
FIG. 7 illustrates an example of a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 7 can be implemented in specialized circuitry configured to perform the noted functions or one or more of the components can be implemented by one or more processors executing instructions to perform the noted functions. FIG. 7 does not limit the scope of this disclosure to any particular implementation of the diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
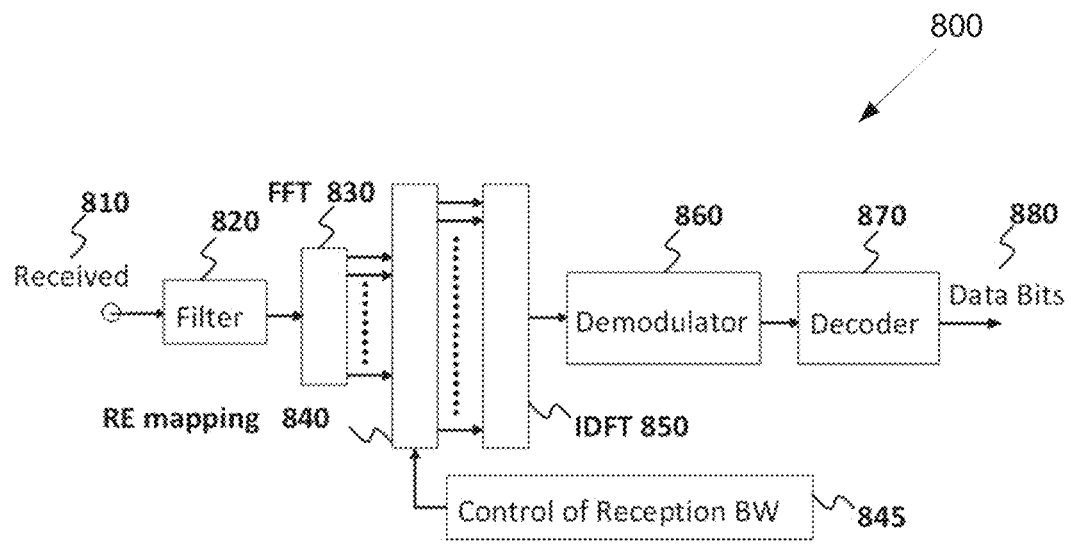
FIG. 8 illustrates an example of a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

In order for the 5G network to support such diverse services with different quality of services (QoS), one method has been identified in 3GPP specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
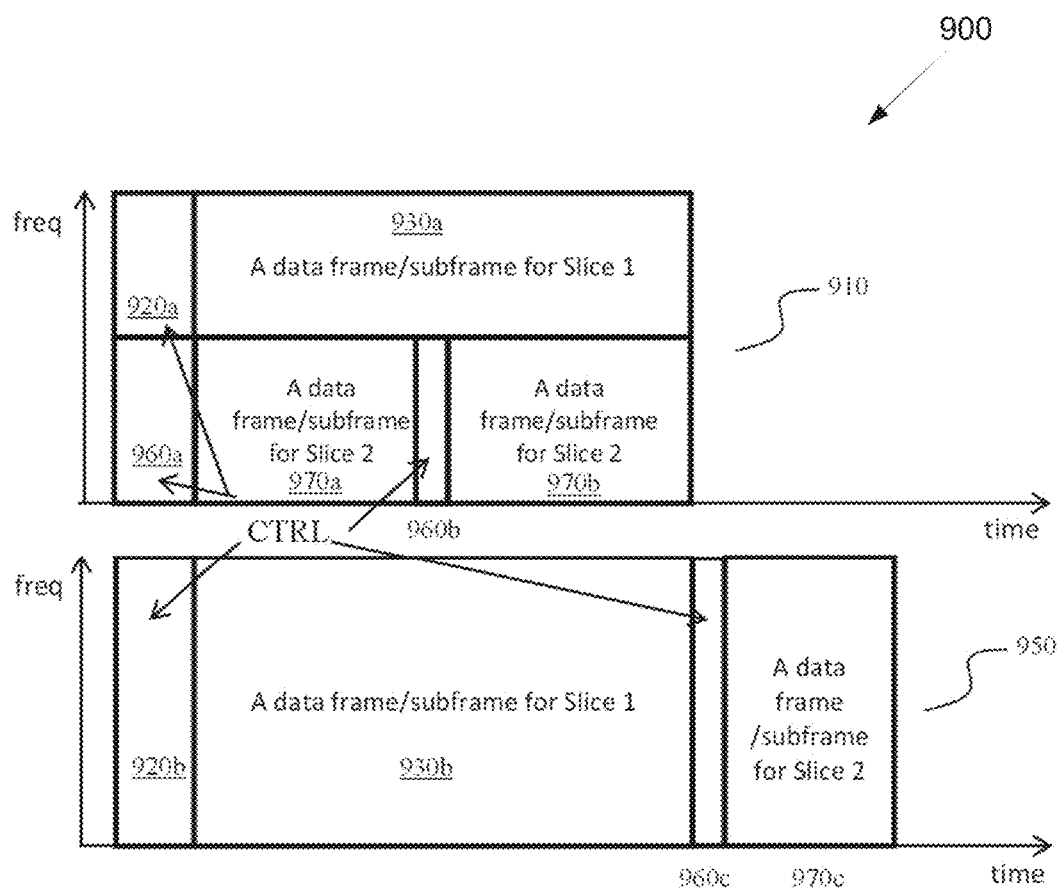
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. One or more of the components illustrated in FIG. 9 can be implemented in specialized circuitry configured to perform the noted functions or one or more of the components can be implemented by one or more processors executing instructions to perform the noted functions. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920a,

960*a*, 960*b*, 920*b*, or 960*c*) and a data component (e.g., 930*a*, 970*a*, 970*b*, 930*b*, or 970*c*). In embodiment 910, the two slices are multiplexed in frequency domain whereas in embodiment 950, the two slices are multiplexed in time domain. These two slices can be transmitted with different sets of numerology.

3GPP specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
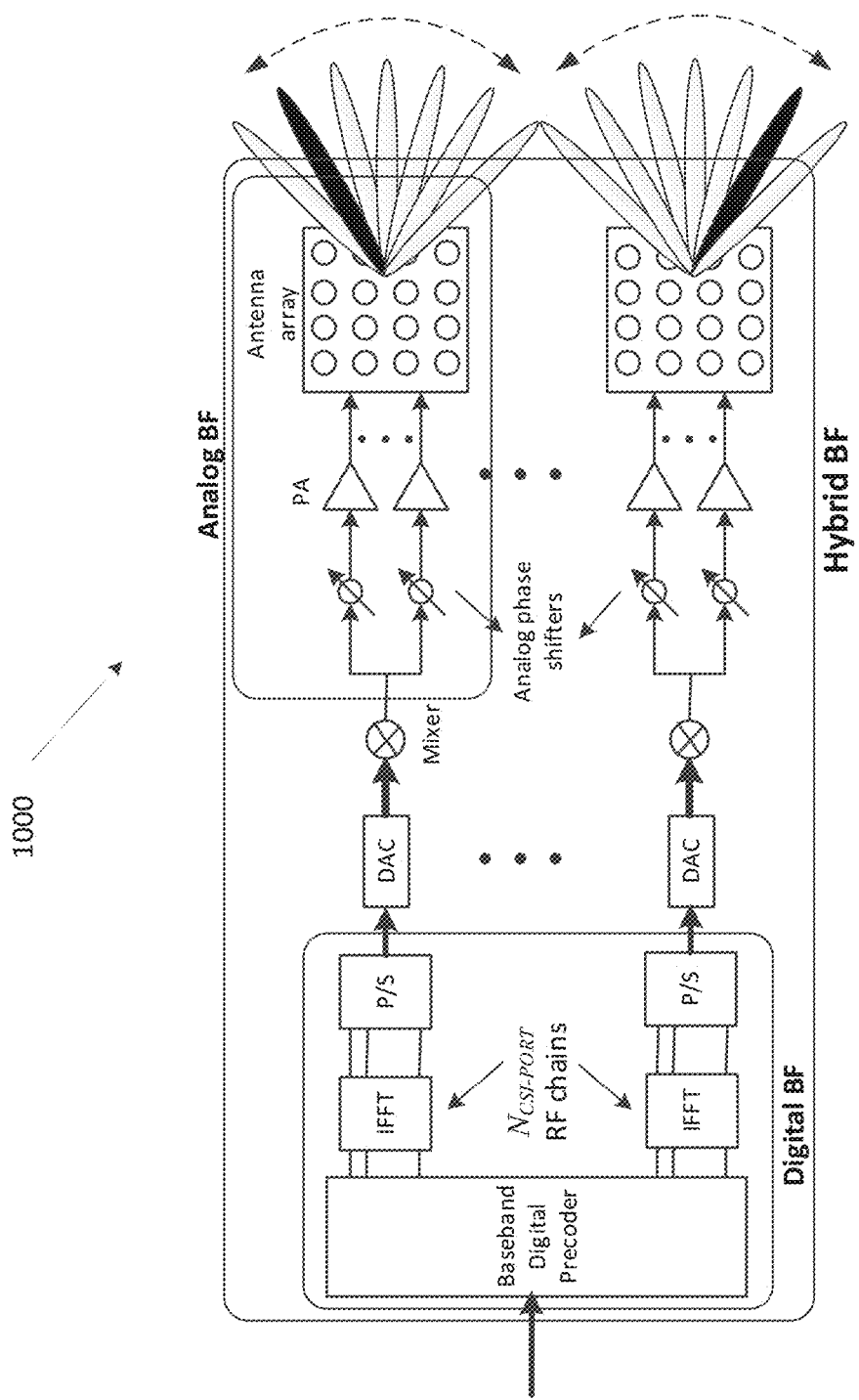
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports which can correspond to the number of digitally precoded ports tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. The analog beam can be configured to sweep across a wider range of angles by varying the phase shifter bank across symbols or subframes. A number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can consist of one or multiple slots) or one slot.

In the present disclosure, the frequency resolution (reporting granularity) and span (reporting bandwidth) of CSI reporting can be defined in terms of frequency "subbands" and "CSI reporting band" (CRB), respectively.

A subband for CSI reporting is defined as a set of contiguous PRBs which represents the smallest frequency unit for CSI reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include all the subbands within the DL system bandwidth. This can also be termed "full-band". Alternatively, CSI reporting band can include only a collection of subbands within the DL system bandwidth. This can also be termed "partial band".

The term "CSI reporting band" is used only as an example for representing a function. Other terms such as "CSI reporting subband set" or "CSI reporting bandwidth" can also be used.

In terms of UE configuration, a UE can be configured with at least one CSI reporting band. This configuration can be semi-static (via higher-layer signaling or RRC) or dynamic (via MAC CE or L1 DL control signaling). When configured with multiple (N) CSI reporting bands (e.g., via RRC signaling), a UE can report CSI associated with n≤N CSI reporting bands. For instance, >6 GHz, large system bandwidth may require multiple CSI reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with $M_n$ subbands when one CSI parameter for all the $M_n$ subbands within the CSI reporting band. A CSI parameter is configured with "subband" for the CSI reporting band with $M_n$ subbands when one CSI parameter is reported for each of the $M_n$ subbands within the CSI reporting band.

Figure 11:
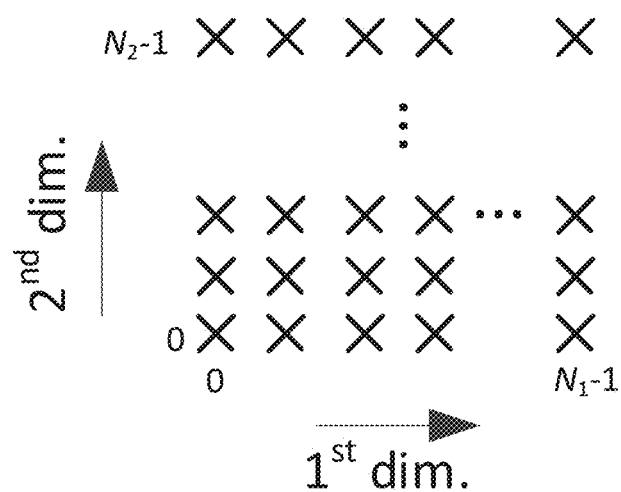
FIG. 11 illustrates an example antenna port layout according to embodiments of the present disclosure.

FIG. 11 illustrates an example antenna port layout 1100 according to embodiments of the present disclosure. The embodiment of the antenna port layout 1100 illustrated in FIG. 11 is for illustration only. FIG. 11 does not limit the scope of this disclosure to any particular implementation of the antenna port layout 1100.

As illustrated in FIG. 11, $N_1$ and $N_2$ are the number of antenna ports with the same polarization in the first and second dimensions, respectively. For 2D antenna port layouts, $N_1>1$, $N_2>1$, and for 1D antenna port layouts $N_1>1$ and $N_2=1$. So, for a dual-polarized antenna port layout, the total number of antenna ports is $2N_1N_2$.

In the 3GPP NR specification, when the UE is configured with higher layer parameter codebookType set to 'typeII' or 'typeII-PortSelection', each PMI value corresponds to the codebook indices $i_1$ and $i_2$. When codebookType='typeII', the first PMI $i_1$ comprises two layer-common (i.e., reported common for two layers if the UE reports RI=2) components indicating

- an orthogonal basis set comprising $N_1N_2$ orthogonal discrete Fourier transform (DFT) beams/vectors (indicated using indicator $i_{1,1}$ indicating the rotation factors $(q_1, q_2)$) and
- L out of $N_1N_2$ beam/vector selection (indicated using indicator $i_{1,2}$), and two layer-specific (i.e., reported for each of the two layers if the UE reports RI=2) components indicating
  - a strongest coefficient (indicated using indicators $i_{1,3,1}$ and $i_{1,3,2}$) and
  - a WB amplitude coefficient $p_{l,i}^{(1)}$ (indicated using indicators $i_{1,4,1}$ and $i_{1,4,2}$).

When codebookType='typeII-PortSelection', the first PMI $i_1$ comprises a layer-common (i.e., reported common for two layers if UE reports RI=2) component indicating L out of $P_{CSI-RS}/2$ port selection (indicated using indicator $i_{1,1}$).

The values of $N_1$ and $N_2$ are configured with the higher layer parameter n1-n2-codebookSubsetRestriction. The supported configurations of ($N_1$, $N_2$) for a given number of CSI-RS ports and the corresponding values of ($O_1$, $O_2$) are given. The number of CSI-RS ports is $2N_1N_2$. The number of CSI-RS ports is given by $P_{CSI-RS} \in \{4, 8, 12, 16, 24, 32\}$ as configured by higher layer parameter nrofPorts. The value of L is configured with the higher layer parameter numberOfBeams.

The first PMI $i_1$ is given by $$i_1 = \begin{cases} [i_{1,1} \quad i_{1,2} \quad i_{1,3,1} \quad i_{1,4,1}] & v=1 \\ [i_{1,1} \quad i_{1,2} \quad i_{1,3,1} \quad i_{1,4,1} \quad i_{1,3,2} \quad i_{1,4,2}] & v=2 \end{cases} \text{if } codebookType \text{ set to 'typeII'}$$

$$i_1 = \begin{cases} [i_{1,1} \quad i_{1,3,1} \quad i_{1,4,1}] & v=1 \\ [i_{1,1} \quad i_{1,3,1} \quad i_{1,4,1} \quad i_{1,3,2} \quad i_{1,4,2}] & v=2 \end{cases} \text{if } codebookType \text{ set to "typeII-PortSelection".}$$

The second PMI $$i_2 = \begin{cases} [i_{2,1,1}] & subbandAmplitude = \text{'false'}, v=1 \\ [i_{2,1,1} \quad i_{2,1,2}] & subbandAmplitude = \text{'false'}, v=2 \\ [i_{2,1,1} \quad i_{2,2,1}] & subbandAmplitude = \text{'true'}, v=1 \\ [i_{2,1,1} \quad i_{2,2,1} \quad i_{2,1,2} \quad i_{2,2,2}] & subbandAmplitude = \text{'true'}, v=2 \end{cases}$$

comprises two layer-specific components indicating
SB phase coefficient $c_{l,i}$ indicated using indicators $i_{2,1,1}$ and $i_{2,1,2}$, and
SB amplitude coefficient $p_{l,i}^{(2)}$ (which can be turned ON or OFF by RRC signaling via subbandAmplitude) indicated using indicators $i_{2,2,1}$ and $i_{2,2,2}$.

The first PMI is reported in a wideband (WB) manner and the second PMI can be reported in a wideband or subband (SB) manner.

Figure 12:
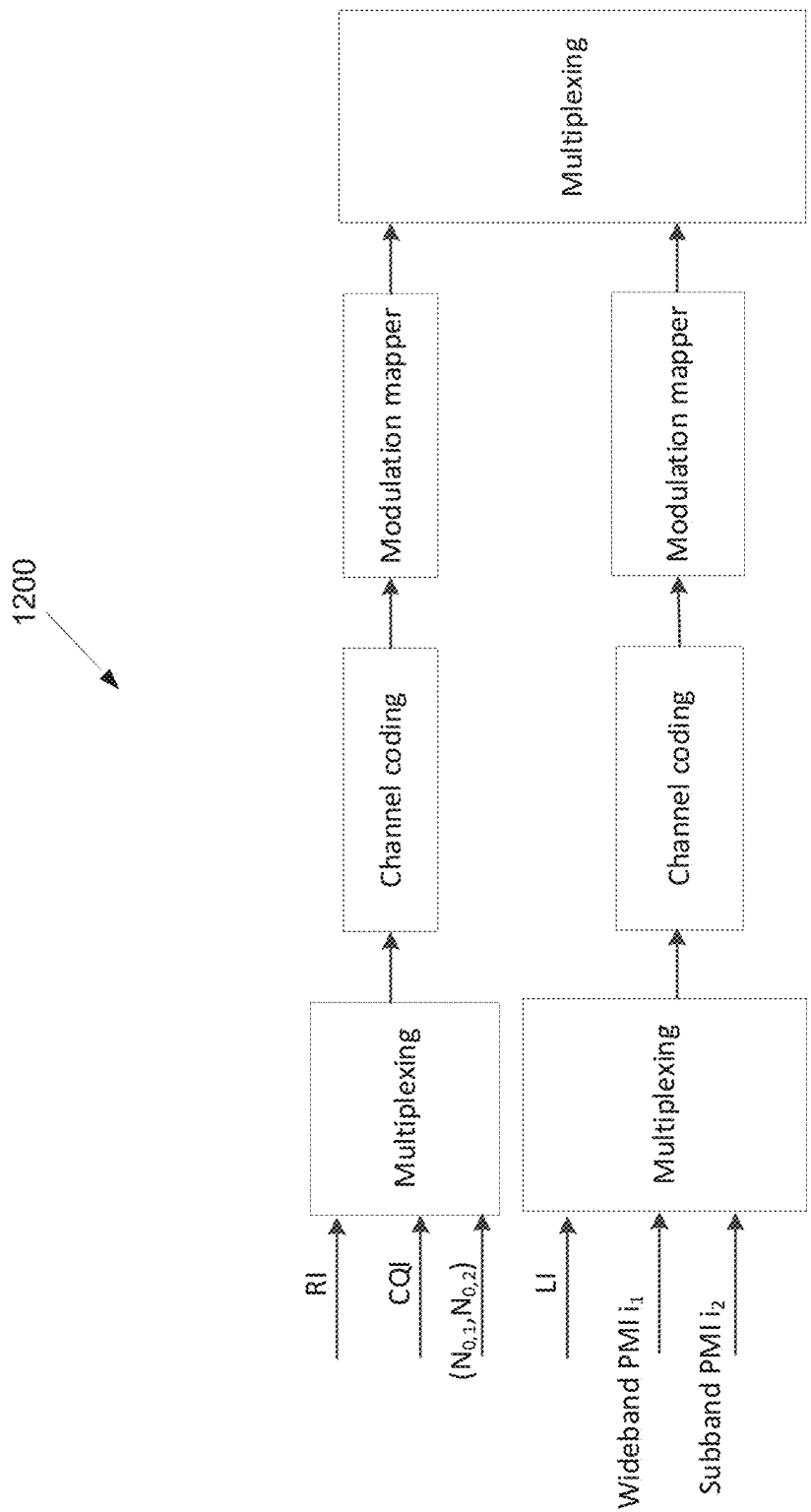
FIG. 12 illustrates an example of a two-part UCI multiplexing process, as may be performed by a UE, according to embodiments of the present disclosure.

FIG. 12 illustrates an example two-part UCI multiplexing process 1200 according to embodiments of the present disclosure, as may be performed by a UE such as UE 116. The embodiment of the two-part UCI multiplexing process 1200 illustrated in FIG. 12 is for illustration only. FIG. 12 does not limit the scope of this disclosure to any particular implementation of the process 1200.

As shown in FIG. 12, the two-part UCI multiplexing 1200 is used to report Type II CSI on PUSCH (or PUCCH) when codebookType='typeII' or 'typeII-PortSelection', wherein
CQI, RI, and ($N_{0,1}$, $N_{0,2}$) are multiplexed and encoded together in part 1, where $N_{0,1}$ and $N_{0,2}$ respectively indicate the number of reported WB amplitudes that are non-zero for layer 1 and layer 2 respectively, i.e., $p_{l,i}^{(1)} \neq 0$; and
Remaining CSI are multiplexed and encoded together in part 2, where the remaining CSI includes the first PMI $i_1$ and the second PMI ($i_2$). It may also include layer indicator (LI).

The part 1 UCI may also include CRI if the UE is configured with more than one CSI-RS resource. When cqi-FormatIndicator=widebandCQI, then CQI reported in part 1 UCI corresponds to WB CQI, and when cqi-FormatIndicator=subbandCQI, then CQI reported in part 1 UCI corresponds to WB CQI and SB differential CQI, where WB CQI is reported common for all SBs, and SB differential CQI is reported for each SB, and the number of SBs (or the set of SB indices) is configured to the UE.

Based on the value of the reported ($N_{0,1}$, $N_{0,2}$) in part 1, the CSI reporting payload (bits) for part 2 is determined. In particular, the components of the second PMI $i_2$ are reported only for the coefficients whose corresponding reported WB amplitudes are non-zero.

As described in U.S. patent application Ser. No. 15/490,561, filed Apr. 18, 2017 and entitled "Method and Apparatus for Explicit CSI Reporting in Advanced Wireless Communication Systems," which is incorporated herein by reference in its entirety, a UE is configured with high-resolution (e.g., Type II) CSI reporting in which the linear combination based Type II CSI reporting framework is extended to include a frequency dimension in addition to the first and second antenna port dimensions.

Figure 13:
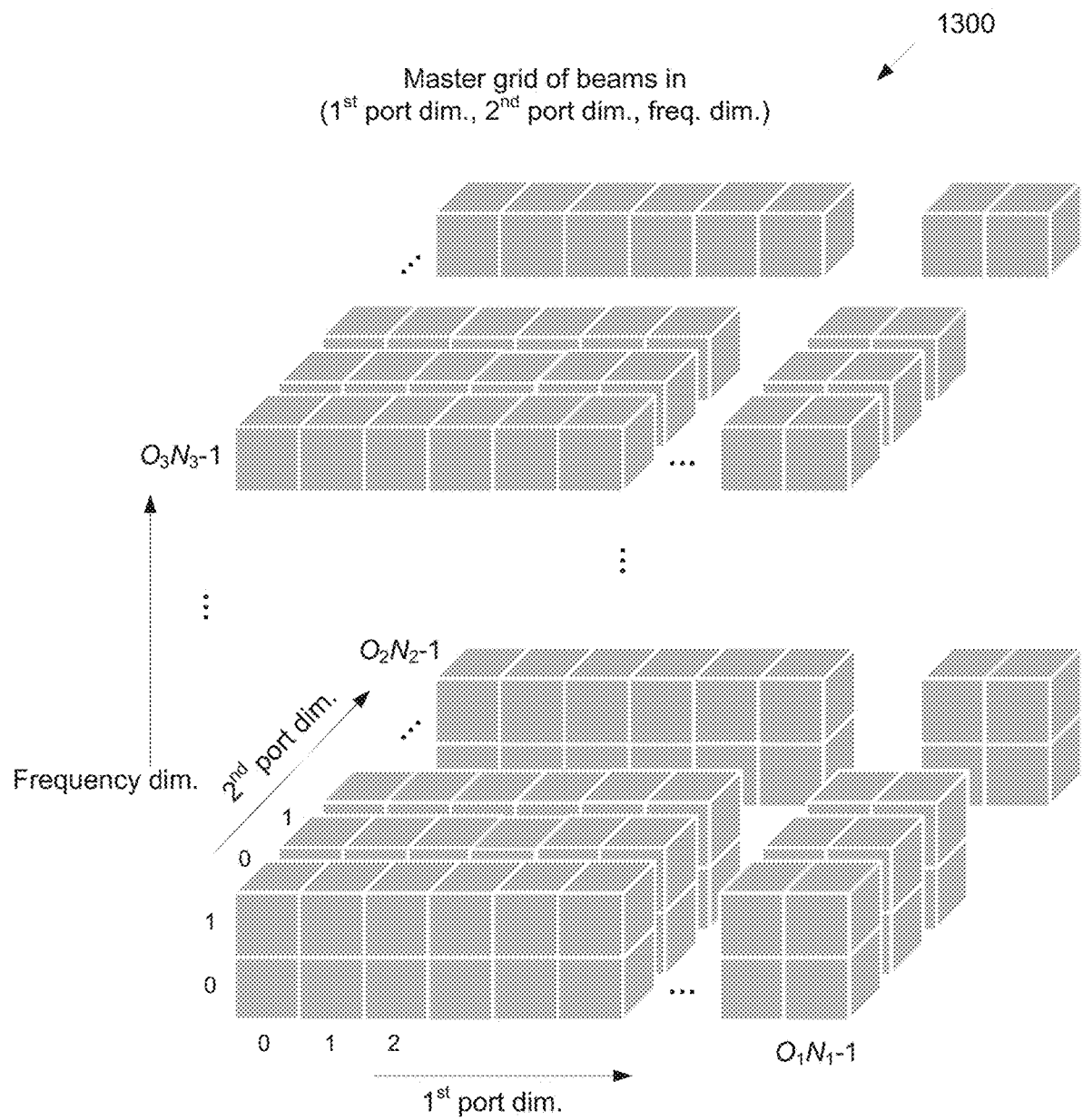
FIG. 13 illustrates an example of a 3D grid of oversampled DFT beams according to embodiments of the present disclosure.

FIG. 13 illustrates an example 3D grid 1300 of the oversampled DFT beams (1st port dim., 2nd port dim., freq. dim.) according to embodiments of the present disclosure. The embodiment of the 3D grid 1300 illustrated in FIG. 13 is for illustration only. FIG. 13 does not limit the scope of this disclosure to any particular implementation of the grid 1300.

As shown, FIG. 13 illustrates the 3D grid 1300 of the oversampled DFT beams (1st port dim., 2nd port dim., freq. dim.) in which
1st dimension is associated with the 1st port dimension,
2nd dimension is associated with the 2nd port dimension, and
3rd dimension is associated with the frequency dimension.

The basis sets for $1^{st}$ and $2^{nd}$ port domain representation are oversampled DFT codebooks of length-$N_1$ and length-$N_2$, respectively, and with oversampling factors $O_1$ and $O_2$, respectively. Likewise, the basis set for frequency domain representation (i.e., 3rd dimension) is an oversampled DFT codebook of length-$N_3$ and with oversampling factor $O_3$. In one example, $O_1 = O_2 = O_3 = 4$. In another example, the oversampling factors $O_i$ belongs to $\{2, 4, 8\}$. In yet another example, at least one of $O_1$, $O_2$, and $O_3$ is higher layer configured (via RRC signaling).

A UE is configured with higher layer parameter CodebookType set to 'TypeII-Compression' or 'TypeIII' for an enhanced Type II CSI reporting in which the pre-coders for all SBs and for a given layer l=1, ..., v, where v is the associated RI value, is given by either $$W^l = \qquad\qquad (Eq.~1)$$

$$AC_l B^H = [a_0 \quad a_1 \quad \ldots \quad a_{L-1}] \begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix}$$

$$[b_0 \quad b_1 \quad \ldots \quad b_{M-1}]^H =$$
$$\sum_{m=0}^{M-1} \sum_{i=0}^{L-1} c_{l,i,m}(a_i b_m^H) = \sum_{i=0}^{L-1} \sum_{m=0}^{M-1} c_{l,i,m}(a_i b_m^H),$$

or

-continued $$W^l = \begin{bmatrix} A & 0 \\ 0 & A \end{bmatrix} C_l B^H = \quad \text{(Eq. 2)}$$

$$\begin{bmatrix} a_0 a_1 \ldots a_{L-1} & 0 \\ 0 & a_0 a_1 \ldots a_{L-1} \end{bmatrix} \begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix}$$

$$[b_0 \; b_1 \; \ldots \; b_{M-1}]^H = \begin{bmatrix} \sum_{m=0}^{M-1} \sum_{i=0}^{L-1} c_{l,i,m}(a_i b_m^H) \\ \sum_{i=0}^{L-1} \sum_{m=0}^{M-1} c_{l,i+L,m}(a_i b_m^H) \end{bmatrix},$$

where $N_1$ is a number of antenna ports in a first antenna port dimension, $N_2$ is a number of antenna ports in a second antenna port dimension, $N_3$ is a number of SBs or frequency domain (FD) units/components for PMI reporting (that comprise the CSI reporting band), which can be different (e.g., less than) from a number of SBs for CQI reporting.

$a_i$ is a $2N_1N_2 \times 1$ (Eq. 1) or $N_1N_2 \times 1$ (Eq. 2) column vector, $b_k$ is a $N_3 \times 1$ column vector, $c_{l,i,m}$ is a complex coefficient.

In the rest of the disclosure, the terms "SB for PMI reporting" and "FD unit for PMI reporting" are used interchangeably since they are equivalent.

In a variation, when a subset K<2LM coefficients (where K is either fixed, configured by the gNB or reported by the UE), then the coefficient $c_{l,i,m}$ in precoder equations Eq. 1 or Eq. 2 is replaced with $v_{l,i,m} \times c_{l,i,m}$, where:

$v_{l,i,m}=1$ if the coefficient $c_{l,i,m}$ is reported by the UE according to some embodiments of this disclosure.

$v_{l,i,m}=0$ otherwise (i.e., $c_{l,i,m}$ is not reported by the UE). The indication whether $v_{l,i,m}=1$ or 0 is according to some embodiments of this disclosure.

In a variation, the precoder equations Eq. 1 or Eq. 2 are respectively generalized to $$W^l = \sum_{i=0}^{L-1} \sum_{m=0}^{M_i-1} c_{l,i,m}(a_i b_{i,m}^H) \text{ and} \quad \text{(Eq. 3)}$$

$$W^l = \begin{bmatrix} \sum_{i=0}^{L-1} \sum_{m=0}^{M_i-1} c_{l,i,m}(a_i b_{i,m}^H) \\ \sum_{i=0}^{L-1} \sum_{m=0}^{M_i-1} c_{l,i+L,m}(a_i b_{i,m}^H) \end{bmatrix}, \quad \text{(Eq. 4)}$$

where for a given i, the number of basis vectors is $M_i$ and the corresponding basis vectors are $\{b_{i,m}\}$. Note that $M_i$ is the number of coefficients $c_{l,i,m}$ reported by the UE for a given i, where $M_i \leq M$ (where $\{M_i\}$ or $\Sigma M_i$ is either fixed, configured by the gNB or reported by the UE).

The columns of $W^l$ are normalized to norm one. For rank R or R layers ($v=R$), the pre-coding matrix is given by $$W^{(R)} = \frac{1}{\sqrt{R}}[W^1 \; W^2 \; \ldots \; W^R].$$

Eq. 2 is assumed in the rest of the disclosure. The embodiments of the disclosure, however, are general and are also applicable to Eq. 1, Eq. 3 and Eq. 4.

Here $L \leq 2N_1N_2$ and $K \leq N_3$. If $L=2N_1N_2$, then A is an identity matrix, and hence not reported. Likewise, if $K=N_3$, then B is an identity matrix, and hence not reported. Assuming $L<2N_1N_2$, in an example, to report columns of A, the oversampled DFT codebook is used. For instance, $a_i = v_{l,m}$, where the quantity $v_{l,m}$ is given by:

$$u_m = \begin{cases} \begin{bmatrix} 1 & e^{j\frac{2\pi m}{O_2 N_2}} & \ldots & e^{j\frac{2\pi m(N_2-1)}{O_2 N_2}} \end{bmatrix} & N_2 > 1 \\ 1 & N_2 = 1 \end{cases}.$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T$$

Similarly, assuming $K<N_3$, in an example, to report columns of B, the oversampled DFT codebook is used. For instance, $b_k = w_k$, where the quantity $w_k$ is given by:

$$w_k = \begin{bmatrix} 1 & e^{j\frac{2\pi k}{O_3 N_3}} & \ldots & e^{j\frac{2\pi k(N_3-1)}{O_3 N_3}} \end{bmatrix}.$$

In another example, discrete cosine transform DCT basis is used to construct/report basis B for the $3^{rd}$ dimension. The m-th column of the DCT compression matrix is simply given by $$[W_f]_{nm} = \begin{cases} \frac{1}{\sqrt{K}}, n = 0 \\ \sqrt{\frac{2}{K}} \cos\frac{\pi(2m+1)n}{2K}, n = 1, \ldots K-1 \end{cases}, \text{ and}$$

$K = N_3$, and $m = 0, \ldots, N_3 - 1$.

Since DCT is applied to real valued coefficients, the DCT is applied to the real and imaginary components (of the channel or channel eigenvectors) separately. Alternatively, the DCT is applied to the magnitude and phase components (of the channel or channel eigenvectors) separately. The use of DFT or DCT basis is for illustration purpose only. The disclosure is applicable to any other basis vectors to construct/report A and B.

Also, in an alternative, for reciprocity-based Type II CSI reporting, a UE is configured with higher layer parameter CodebookType set to 'TypeII-PortSelection-Compression' or 'TypeIII-PortSelection' for an enhanced Type II CSI reporting with port selection in which the pre-coders for all SBs and for a given layer l=1, . . . , v, where v is the associated RI value, is given by $W^l = AC_l B^H$, where $N_1$, $N_2$, $N_3$, and are defined as above except that the matrix A comprises port selection vectors. For instance, the L antenna ports per polarization or column vectors of A are selected by the index $q_1$, where $$q_1 \in \left\{0, 1, \ldots, \left\lceil \frac{P_{CSI-RS}}{2d} \right\rceil - 1\right\}$$

(this requires $$\left\lceil \log_2 \left\lceil \frac{P_{CSI-RS}}{2d} \right\rceil \right\rceil \text{ bits}),$$

and the value of d is configured with the higher layer parameter PortSelectionSamplingSize, where $d \in \{1, 2, 3, 4\}$ and $$d \leq \min\left(\frac{P_{CSI-RS}}{2}, L\right).$$

To report columns of A, the port selection vectors are used, For instance, $a_i = v_m$, where the quantity $v_m$ is a $P_{CSI-RS}/2$-element column vector containing a value of 1 in element (m mod $P_{CSI-RS}/2$) and zeros elsewhere (where the first element is element 0).

On a high level, a precoder $W^l$ can be described as follows.

$$W^l = AC_l B^H = W_1 \tilde{W}_2 W_f^H, \quad (5)$$

where $A = W_1$ corresponds to the $W_1$ in Type II CSI codebook, i.e., $$W_1 = \begin{bmatrix} A & 0 \\ 0 & A \end{bmatrix}$$

and $B = W_f$. The $C = \tilde{W}_2$ matrix consists of all the required linear combination coefficients (e.g., amplitude and phase or real or imaginary). Note that the coefficients matrix $\tilde{W}_2$ comprises 2LM coefficients. In the rest of the disclosure, several schemes are proposed for the uplink control information (UCI) carrying the CSI that is calculated using a PMI determined according to the above-identified framework (Eq. 5).

In one example, the PMI indicating the precoding matrix $W^{(R)}$ for R=v layers comprises a first PMI i1 and a second PMI i2. The first PMI corresponds to a wideband (WB) component of the PMI and the second PMI corresponds to a subband (SB) component of the PMI.

The first PMI $i_1$ comprises the following components:
orthogonal basis set for $W_1$ and $W_f$ (which for example, can be indicated using index $i_{1,1}$ indicating the rotation factors $(q_1, q_2, q_3)$), $q_i \in \{0, 1, \ldots, O_i - 1\}$; in one example, $O_3 = 1$, hence $q_3$ can be fixed, for example, to $q_3 = 0$, and not reported;
L beam selection for $W_1$ and M beam selection for $W_f$ (which for example, can be indicated using index $i_{1,2}$);
strongest coefficient indicator (SCI) (which for example, can be indicated using index $i_{1,3}$) indicating the strongest coefficient out of 2LM coefficients comprising $C = \tilde{W}_2$; and
indices of $N_{0,l}$ non-zero (NZ) coefficients for each layer $l = 1, \ldots, v$ (which for example, can be indicated using index $i_{1,4}$).

Here, $i_{1,1}, i_{1,2}, i_{1,3}$, and $i_{1,4}$ are components of the first PMI $i_1$. The indices of NZ coefficients are reported either explicitly using a bitmap $B_l$ of length 2LM or a combinatorial index $$\left\lceil \log_2 \binom{2LM}{N_{o,l}} \right\rceil$$

or is derived implicitly, for example, based on amplitude or power of beams comprising $W_1$ and/or $W_f$. Bitmap $B_l$ is assumed in the rest of the disclosure.

The second PMI $i_2$ comprises the following components:
phase $\phi_{l,i,m}$ of coefficients $c_{l,i,m}$ (which for example, can be indicated using index $i_{2,1}$); and
amplitude $p_{l,i,m}$ of coefficients $c_{l,i,m}$ (which for example, can be indicated using index $i_{2,2}$).

Here, $i_{2,1}$ and $i_{2,2}$ are components of the second PMI $i_2$. In one example, amplitude $p_{l,i,m} = p_{l,i,m}^{(1)} p_{l,i,m}^{(2)}$ where $p_{l,i,m}^{(1)}$ and $p_{l,i,m}^{(2)}$ respectively are a first and a second amplitude component.

In one example, the components SCI, the indices of NZ coefficients, amplitude and phase are reported layer-specific, that is, they are reported independently for each layer. In this case, the indices $i_{1,3}, i_{1,4}, i_{2,1}$ and $i_{2,2}$ comprise v sub-indices. For example, when v=2, these indices are expressed further as $$i_{1,3} = \begin{cases} [i_{1,3,1}] & RI = 1 \\ [i_{1,3,1} \ i_{1,3,2}] & RI = 2 \end{cases}, i_{1,4} = \begin{cases} [i_{1,4,1}] & RI = 1 \\ [i_{1,4,1} \ i_{1,4,2}] & RI = 2 \end{cases},$$

$$i_{2,1} = \begin{cases} [i_{2,1,1}] & RI = 1 \\ [i_{2,1,1} \ i_{2,12}] & RI = 2 \end{cases} \text{ and } i_{2,2} = \begin{cases} [i_{2,2,1}] & RI = 1 \\ [i_{2,2,1} \ i_{2,22}] & RI = 2 \end{cases}.$$

Note that $i_{1,3,2}, i_{1,4,2}, i_{2,1,2}$, and $i_{2,1,2}$ are reported only when RI=2 is reported.

In one example, a single PMI $i = [i_1, i_2, i_3, i_4, i_5, i_6]$ is used to report the first PMI indices $i_{1,1}, i_{1,2}, i_{1,3}$, and $i_{1,4}$, and the second PMI indices $i_{2,1}$ and $i_{2,2}$ by using the following mapping: $i_1 = i_{1,1}, i_2 = i_{1,2}, i_3 = i_{1,3}, i_4 = i_{1,4}, i_5 = i_{2,1}$, and $i_6 = i_{2,2}$.

Figure 14:
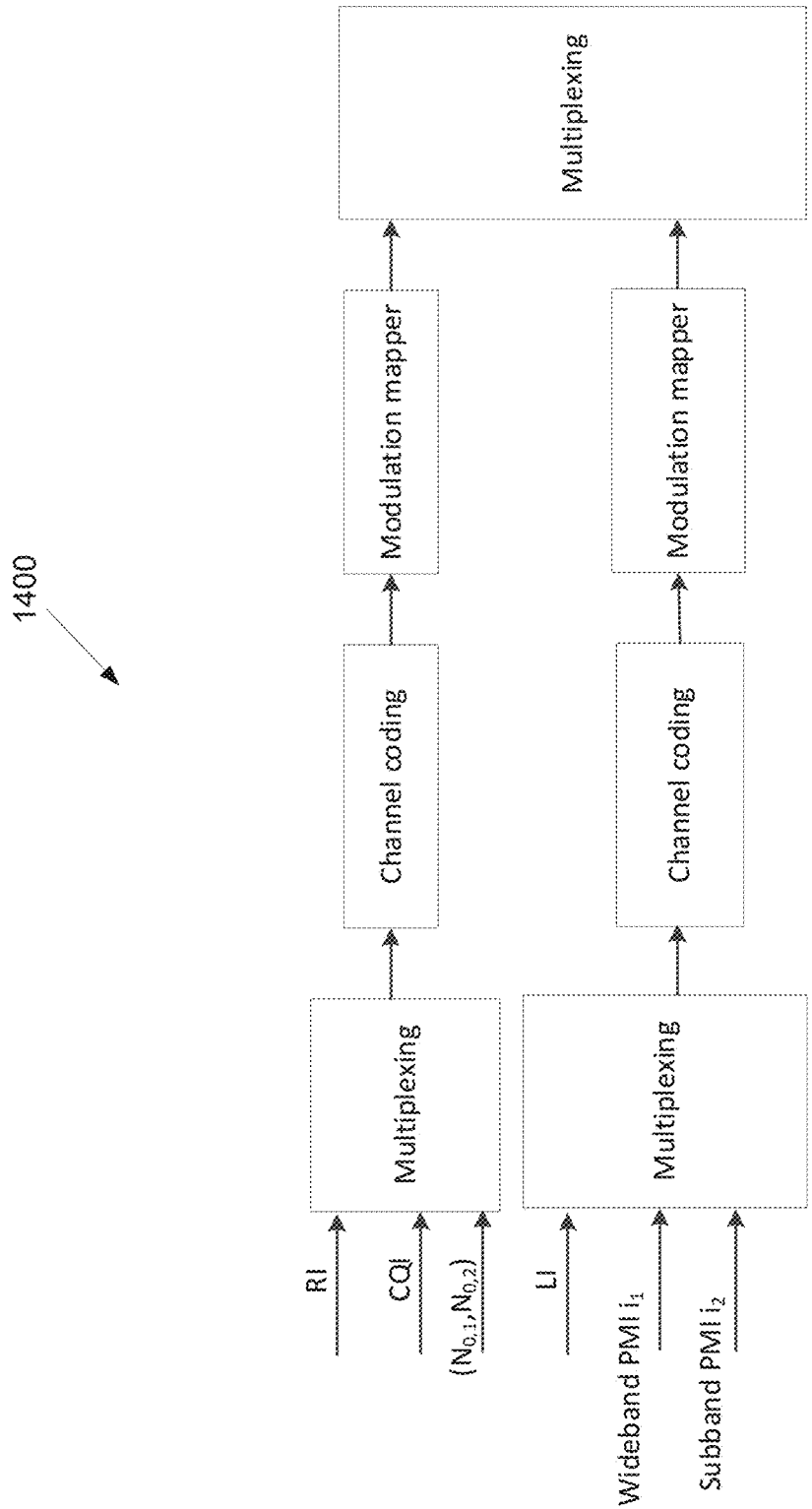
FIG. 14 illustrates an example of a two-part UCI multiplexing process, as may be performed by a UE, according to embodiments of the present disclosure.

FIG. 14 illustrates an example two-part UCI process 1400 according to embodiments of the present disclosure, as may be performed by a UE such as UE 116. The embodiment of the two-part UCI multiplexing process 1400 illustrated in FIG. 14 is for illustration only. FIG. 14 does not limit the scope of this disclosure to any particular implementation of the process 1400.

In embodiment 0, as shown in FIG. 14, the two-part UCI multiplexing process 1400 is used to multiplex and report CSI according to the above-mentioned framework (Eq. 5), wherein:
CQI, RI, and $(N_{0,1}, \ldots, N_{0,v})$ are multiplexed and encoded together in UCI part 1, where $N_{0,l}$ indicates a number of non-zero (NZ) coefficients for layer l; and
LI, the first PMI $i_1$ and the second PMI $(i_2)$ are multiplexed and encoded together in UCI part 2.

In a variation, LI is not included in UCI part 2. In another variation, LI is included in UCI part 1 (not in UCI part 2).

The part 1 UCI may also include CRI if the UE is configured with more than one CSI-RS resource. When cqi-FormatIndicator=widebandCQI, then CQI reported in part 1 UCI corresponds to WB CQI, and when cqi-FormatIndicator=subbandCQI, then CQI reported in part 1 UCI corresponds to WB CQI and SB differential CQI, where WB CQI is reported common for all SBs, and SB differential CQI is reported for each SB, and the number of SBs (or the set of SB indices) is configured to the UE.

In one example, the maximum value of RI is 4. In another example, the maximum value of RI can be more than 4. In this later example, the CQI in UCI part 1 corresponds to up to 4 layers mapped into a first codeword (CW1) or transport block (TB1), and if RI>4, then a second CQI is reported in UCI part 2, which corresponds to additional RI−4 layers mapped into a second codeword (CW2) or transport block (TB2).

Based on the value of the reported $(N_{0,1}, \ldots, N_{0,v})$ in part 1, the CSI reporting payload (bits) for part 2 is determined. In particular, the components of the second PMI $i_2$ are reported only for the coefficients that are non-zero.

In embodiment 0A, which is a variation of embodiment 0, the two-part UCI multiplexing process 1400 is used to multiplex and report CSI according to the above-mentioned framework (Eq. 5), wherein CQI, RI, and $N_0 = \Sigma_{l=1}^{v} N_{0,l}$ are multiplexed and encoded together in UCI part 1, where $N_0$ indicates the total number of NZ coefficients across v layers; and LI, the first PMI i1 and the second PMI (i2) are multiplexed and encoded together in UCI part 2.

Note that number of NZ coefficients $\{N_{0,l}\}$ for each layer is not reported in UCI part 1, their sum $(N_0)$ is reported instead. The rest of the details of embodiment 0 are also applicable in this embodiment.

Figure 15:
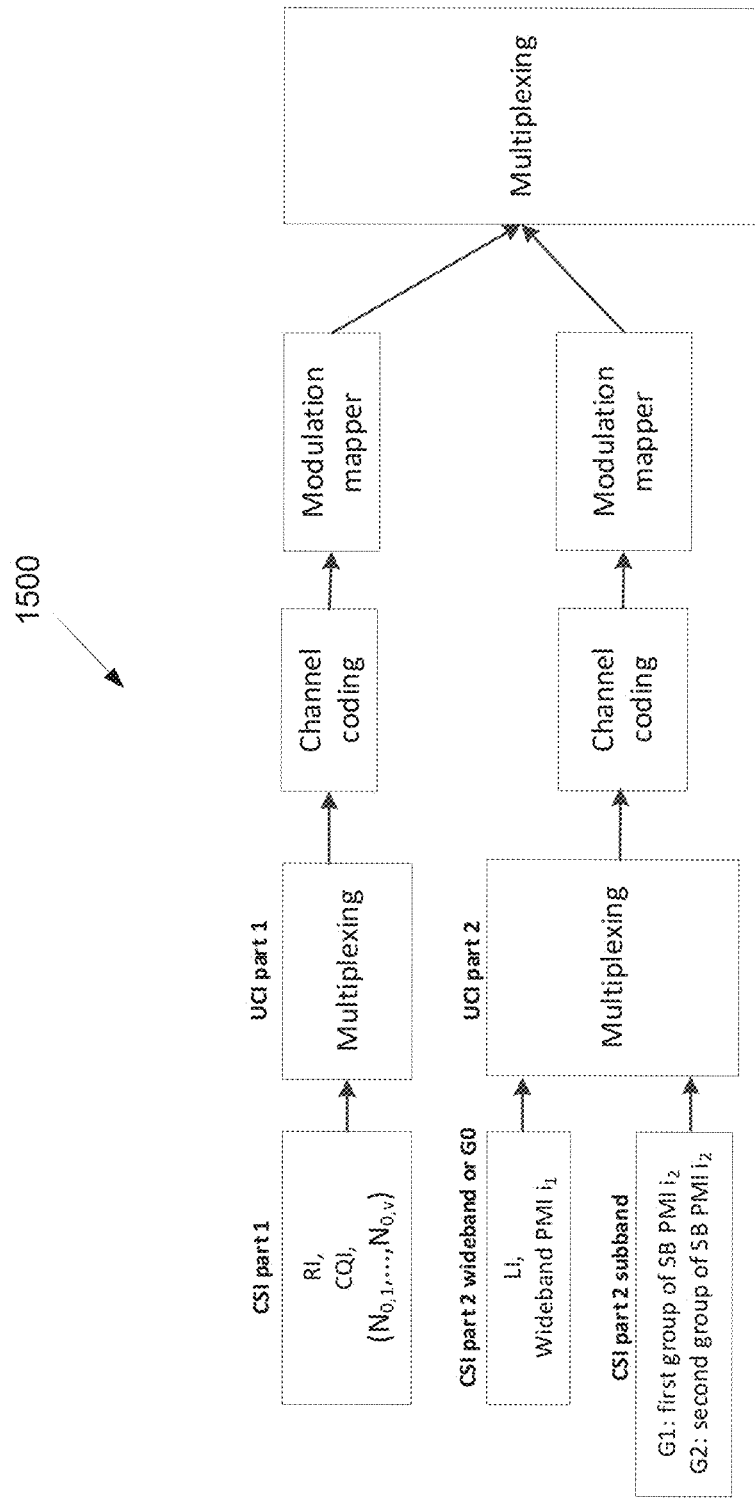
FIG. 15 illustrates an example of a two-part UCI multiplexing process, as may be performed by a UE, according to embodiments of the present disclosure.

FIG. 15 illustrates an example two-part UCI multiplexing process 1500 according to embodiments of the present disclosure, as may be performed by a UE such as UE 116. The embodiment of the two-part UCI multiplexing process 1500 illustrated in FIG. 15 is for illustration only. FIG. 15 does not limit the scope of this disclosure to any particular implementation of the process 1500.

In embodiment 1, as shown in FIG. 15, the two-part UCI multiplexing process 1500 is used to multiplex and report CSI according to the above-mentioned framework (Eq. 5), wherein:

CSI part 1 comprising CQI, RI, and $(N_{0,1}, \ldots, N_{0,v})$ are multiplexed and encoded together in UCI part 1, where $N_{0,l}$ indicates a number of non-zero (NZ) coefficients for layer l; and CSI part 2 comprising LI, the first PMI i1 and the second PMI (i2) are multiplexed and encoded together in UCI part 2.

The CSI part 2 is segmented in two segments or three groups.

CSI part 2 wideband or group G0: comprising LI, and the first PMI i1; and

CSI part 2 subband: comprising the second PMI i2, wherein the components of the second PMI are grouped into two groups:

G1: comprising a first group of second PMI components (for example, amplitude and phase of a first group of NZ coefficients);

G2: comprising a second group of second PMI components (for example, amplitude and phase of a second group of NZ coefficients).

Here, the bitmap $B_l$ for all layers $l \in \{1, \ldots, v\}$ is included the first PMI $i_1$.

In one example, the amplitude and phase indices associated with the strongest coefficient(s) are also included in G1 and/or G2. In another example, the amplitude and phase indices associated with the strongest coefficient(s) are excluded from (not included in) G1 and/or G2.

In a variation, LI is not included in UCI part 2 wideband or group G0. In another variation, LI is included in UCI part 1 (not in UCI part 2).

The part 1 UCI may also include CRI if the UE is configured with more than one CSI-RS resource. When cqi-FormatIndicator=widebandCQI, then CQI reported in part 1 UCI corresponds to WB CQI, and when cqi-FormatIndicator=subbandCQI, then CQI reported in part 1 UCI corresponds to WB CQI and SB differential CQI, where WB CQI is reported common for all SBs, and SB differential CQI is reported for each SB, and the number of SBs (or the set of SB indices) is configured to the UE.

In one example, the maximum value of RI is 4. In another example, the maximum value of RI can be more than 4. In this later example, the CQI in UCI part 1 corresponds to up to 4 layers mapped into a first codeword (CW1) or transport block (TB1), and if RI>4, then a second CQI is reported in UCI part 2, which corresponds to additional RI−4 layers mapped into a second codeword (CW2) or transport block (TB2). In one example, the second CQI is included in CSI part 2 wideband. In another example, the second CQI is included in CSI part 2 subband. In one example, the second CQI is included in CSI part 2 wideband. In another example, when cqi-FormatIndicator=subbandCQI, then the second CQI comprises a WB second CQI included in CSI part 2 wideband and SB differential second CQI included in CSI part 2 subband.

Based on the value of the reported $(N_{0,1}, \ldots, N_{0,v})$ in part 1, the CSI reporting payload (bits) for part 2 is determined. In particular, the components of the second PMI $i_2$ are reported only for the coefficients that are non-zero.

Figure 16:
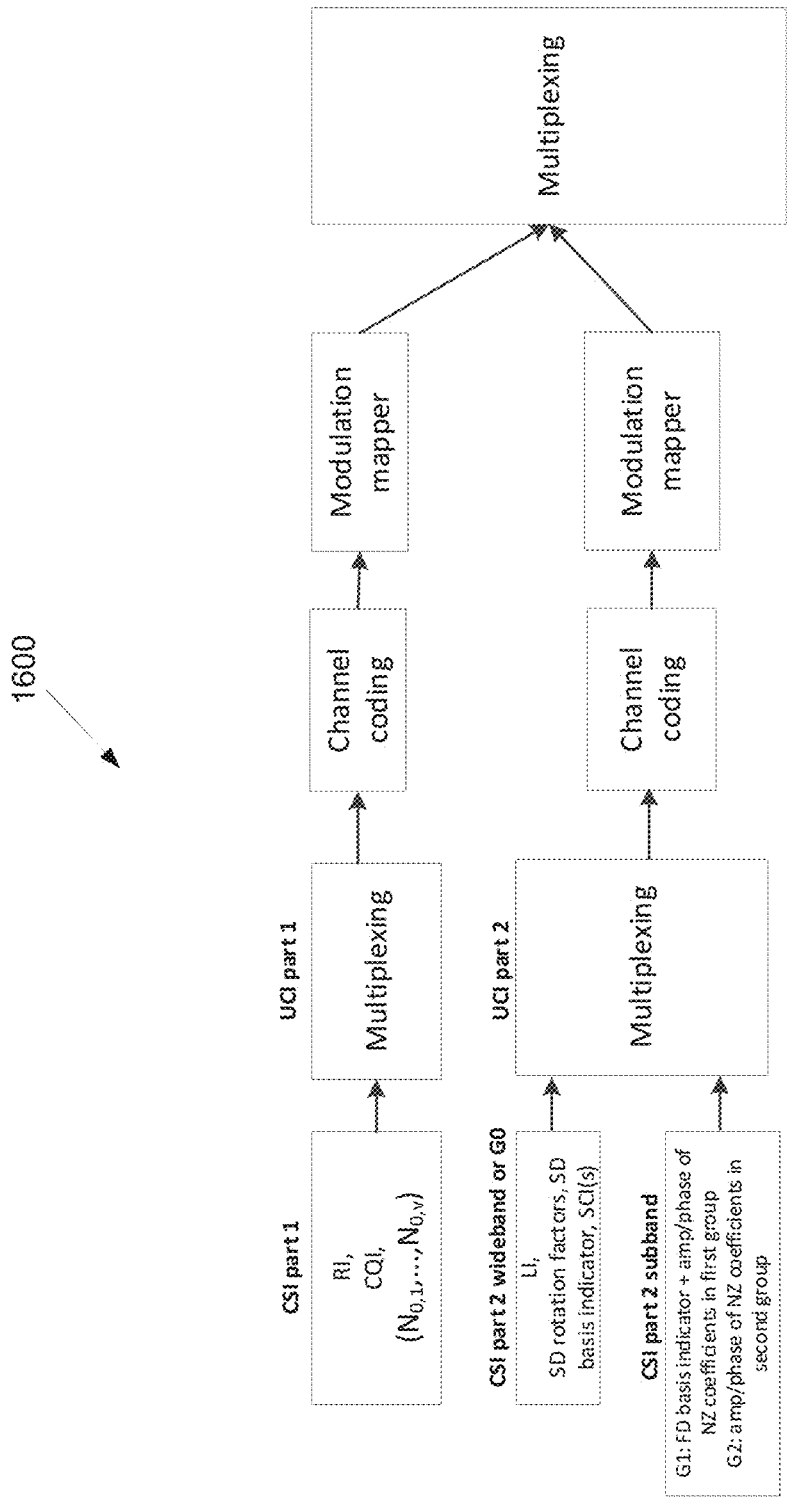
FIG. 16 illustrates an example of a two-part UCI multiplexing process, as may be performed by a UE, according to embodiments of the present disclosure.

FIG. 16 illustrates an example two-part UCI multiplexing process 1600 according to embodiments of the present disclosure, as may be performed by a UE such as UE 116. The embodiment of the two-part UCI multiplexing process 1600 illustrated in FIG. 16 is for illustration only. FIG. 16 does not limit the scope of this disclosure to any particular implementation of the process 1600.

In embodiment 1X, as shown in FIG. 16, the CSI part 2 comprised in the two-part UCI multiplexing process 1600 is segmented in two segments or three groups:

CSI part 2 wideband or group G0: comprising LI, and SD rotation factors indicating (q1, q2, q3), SD basis indicator indicating L beam selection for $W_1$, and SCI(s) (indicated via the first PMI i1); and CSI part 2 subband: comprising the second PMI i2, wherein the components of the second PMI are grouped into two groups G1: comprising a first group of second PMI components (for example, amplitude and phase of a first group of NZ coefficients), and FD indicator indicating M beam selection for $W_f$ (indicated via the first PMI i1,2);

G2: comprising a second group of second PMI components (for example, amplitude and phase of a second group of NZ coefficients).

The rest of the details of embodiment 1 are also applicable in this embodiment.

Let (i, m) be an index of a coefficient $c_{l,i,m}$ comprising $C = \tilde{W}_2$ matrix for layer l. Let (i*, m*) be the index of the strongest coefficient $c_{l,i^*,m^*}$ for layer l indicated by the SCI. The two groups, G1 and G2, of the second PMI components in embodiment 1 or 1X are determined based on at least one of the following alternatives (Alt). One of these alternatives is either fixed, or configured via higher layer signaling, or reported by the UE.

In one alternative Alt 1-0: The strongest coefficient indicator (SCI) is used for grouping. At least one of the sub-alternatives is used for grouping.

In one alternative Alt 1-0-0: The group $G_1$ comprises amplitude and phase of NZ coefficients $c_{l,i,m}$ whose row index i=i* or column index m=m*, and the group $G_2$ comprises amplitude and phase of the rest of the NZ coefficients.

In one alternative Alt 1-0-1: The group $G_1$ comprises amplitude and phase of NZ coefficients $c_{l,i,m}$ whose row index i=i*, and the group $G_2$ comprises amplitude and phase of the rest of the NZ coefficients.

In one alternative Alt 1-0-2: The group $G_1$ comprises amplitude and phase of NZ coefficients $c_{l,i,m}$ whose column index m=m*, and the group $G_2$ comprises amplitude and phase of the rest of the NZ coefficients.

In one alternative Alt 1-1: The FD beam index m∈{0,1, . . . , M−1} is used for grouping. The group $G_1$ comprises amplitude and phase of NZ coefficients $c_{l,i,m}$ whose column index m∈$I_1$ and the group $G_2$ comprises amplitude and phase of NZ coefficients $c_{l,i,m}$ whose column index m∈$I_2$. At least one of the sub-alternatives is used for $I_1$ and $I_2$.

In one alternative Alt 1-1-0: $I_1$ equals a first half of FD beams, and $I_2$ equals a second half of FD beams, wherein the first half of FD beams $$I_1 = \left\{0, 1, \ldots, \left\lceil \frac{M}{2} \right\rceil - 1\right\},$$

and the second half of FD beams $$I_2 = \left\{\left\lceil \frac{M}{2} \right\rceil, \left\lceil \frac{M}{2} \right\rceil + 1, \ldots M - 1\right\}.$$

Alternatively, the first half of FD beams $$I_1 = \left\{0, 1, \ldots, \left\lceil \frac{M}{2} \right\rceil - 1\right\},$$

and the second half of FD beams $$I_2 = \left\{\left\lceil \frac{M}{2} \right\rceil, \left\lceil \frac{M}{2} \right\rceil + 1, \ldots M - 1\right\}.$$

In one alternative Alt 1-1-1: $I_1$ equals the one of the two halves of FD beams in which the FD beam m* of the strongest coefficient $c_{l,i*,m*}$ belongs, and $I_2$ equals the other half of FD beams, where the two halves of FD beams are as explained in Alt 1-1-0.

In one alternative Alt 1-1-1X: $I_1$ equals a first half of FD beams, and $I_2$ equals a second half of FD beams, wherein the first half and the second half of FD beams are as explained in Alt 1-1-0. In addition, the FD beam m* of the strongest coefficient $c_{l,i*,m*}$ is always included in $I_1$ regardless whether it belongs to the first half or the second half of FD beams.

In one alternative Alt 1-1-1Y: $I_1$ equals a first half of FD beams, and $I_2$ equals a second half of FD beams, wherein the first half and the second half of FD beams are as explained in Alt 1-1-0. In addition, the FD beam m* of the strongest coefficient $c_{l,i*,m*}$ is always included in $I_2$ regardless whether it belongs to the first half or the second half of FD beams.

In one alternative Alt 1-1-2: $I_1$ equals even-numbered FD beams, and $I_2$ equals odd-numbered FD beams, i.e., $I_1$={0,2, . . . ,}, and $I_2$={1,3, . . . }.

In one alternative Alt 1-1-2X: $I_1$ and $I_2$ are as explained in Alt 1-1-2. In addition, the FD beam m* of the strongest coefficient $c_{l,i*,m*}$ is always included in $I_1$ regardless whether it is even or odd.

In one alternative Alt 1-1-2Y: $I_1$ and $I_2$ are as explained in Alt 1-1-2. In addition, the FD beam m* of the strongest coefficient $c_{l,i*,m*}$ is always included in $I_2$ regardless whether it is even or odd.

In one alternative Alt 1-1-3: $I_1$ equals odd-numbered FD beams, and $I_2$ equals even-numbered FD beams, i.e., $I_2$={0, 2, . . . ,}, and $I_1$={1,3, . . . }.

In one alternative Alt 1-1-3X: $I_1$ and $I_2$ are as explained in Alt 1-1-3. In addition, the FD beam m* of the strongest coefficient $c_{l,i*,m*}$ is always included in $I_1$ regardless whether it is even or odd.

In one alternative Alt 1-1-3Y: $I_1$ and $I_2$ are as explained in Alt 1-1-3. In addition, the FD beam m* of the strongest coefficient $c_{l,i*,m*}$ is always included in $I_2$ regardless whether it is even or odd.

In one alternative Alt 1-1-4: $I_1$ equals even-numbered FD beams and $I_2$ equals odd-numbered FD beams if the FD beam m* of the strongest coefficient $c_{l,i*,m*}$ is even, i.e., $I_1$={0,2, . . . ,}, $I_2$={1,3, . . . }, and m*∈$I_1$; and $I_1$ equals odd-numbered FD beams and $I_2$ equals even-numbered FD beams if the FD beam m* of the strongest coefficient $c_{l,i*,m*}$ is odd, i.e., $I_2$={0,2, . . . , }, $I_1$={1,3, . . . }, and m*∈$I_1$.

In one alternative Alt 1-1-5: $I_1$ equals even-numbered FD beams and $I_2$ equals odd-numbered FD beams if the FD beam m* of the strongest coefficient $c_{l,i*,m*}$ is odd, i.e., $I_1$={0,2, . . . ,}, $I_2$={1,3, . . . }, and m*∈$I_2$; and $I_1$ equals odd-numbered FD beams and $I_2$ equals even-numbered FD beams if the FD beam m* of the strongest coefficient $c_{l,i*,m*}$ is even, i.e., $I_2$={0,2, . . . ,}, $I_1$={1,3, . . . }, and m*∈$I_2$.

In one alternative Alt 1-1-6: $I_1$ is reported by the UE ($I_2$=rest of the FD beams not included in reported $I_1$). In one example, this reporting (of $I_1$) is via a bitmap of length M comprising x ones "1", where the location of ones "1" indicate indices of FD beams included in $I_1$. In another example, this reporting (of $I_1$) is via a bitmap of length M comprising x zeros "0", where the location of zeros "0" indicate indices of FD beams included in $I_1$. In another example, this reporting is via a combinatorial index reporting using $$\left\lceil \log_2 \binom{M}{x} \right\rceil$$

bits. Here, x is either unrestricted (can take any value from {1, . . . , M}), or fixed $$\left(\text{e.g., } \left\lceil \frac{M}{2} \right\rceil \text{ or } \left\lfloor \frac{M}{2} \right\rfloor\right)$$

or higher layer configured or reported by the UE. Also, $I_1$ can be reported via CSI part 1 (multiplexed in UCI part 1) or CSI part 2 wideband (multiplexed in UCI part 2).

In one alternative Alt 1-1-7: $I_1$ is reported by the UE ($I_2$=rest of the FD beams not included in reported $I_1$) where $I_1$ includes the FD beam m* of the strongest coefficient $c_{l,i*,m*}$. The rest of the details about $I_1$ is the same as in Alt 1-1-6. In particular, the reporting (of $I_1$) is either via a bitmap of length M−1 (minus 1 since m* is always included in $I_1$), or via a combinatorial index reporting using $$\left\lceil \log_2 \binom{M-1}{x-1} \right\rceil$$

bits.

In one alternative Alt 1-2: The SD beam index i∈{0,1, . . . , 2L−1} is used for grouping. The group $G_1$ comprises amplitude and phase of NZ coefficients $c_{l,i,m}$ whose row index $i \in I_1$ and the group $G_2$ comprises amplitude and phase of NZ coefficients $c_{l,i,m}$ whose row index $i \in I_2$. At least one of the sub-alternatives is used for $I_1$ and $I_2$.

In one alternative Alt 1-2-0: $I_1$ equals a first half of SD beams, and $I_2$ equals a second half of SD beams, wherein the first half of SD beams $I_1 = \{0, 1, \ldots, L-1\}$, and the second half of SD beams $I_2 = \{L, L+1, \ldots 2L-1\}$.

In one alternative Alt 1-2-1: $I_1$ equals the one of the two halves of SD beams in which the SD beam $i^*$ of the strongest coefficient $c_{l,i^*,m^*}$ belongs, and $I_2$ equals the other half of SD beams, where the two halves of SD beams are as explained in Alt 1-2-0.

In one alternative Alt 1-2-1X: $I_1$ and $I_2$ are as explained in Alt 1-2-0. In addition, the SD beam $i^*$ of the strongest coefficient $c_{l,i^*,m^*}$ is always included in $I_1$ regardless whether it belongs to the first half or the second half of FD beams.

In one alternative Alt 1-2-1Y: $I_1$ and $I_2$ are as explained in Alt 1-2-0. In addition, the SD beam $i^*$ of the strongest coefficient $c_{l,i^*,m^*}$ is always included in $I_2$ regardless whether it belongs to the first half or the second half of FD beams.

In one alternative Alt 1-2-2: $I_1$ equals even-numbered SD beams, and $I_2$ equals odd-numbered SD beams, i.e., $I_1 = \{0, 2, \ldots, \}$, and $I_2 = \{1, 3, \ldots \}$.

In one alternative Alt 1-2-2X: $I_1$ and $I_2$ are as explained in Alt 1-2-2. In addition, the SD beam $i^*$ of the strongest coefficient $c_{l,i^*,m^*}$ is always included in $I_1$ regardless whether it is even or odd.

In one alternative Alt 1-2-2Y: $I_1$ and $I_2$ are as explained in Alt 1-2-2. In addition, the SD beam $i^*$ of the strongest coefficient $c_{l,i^*,m^*}$ is always included in $I_2$ regardless whether it is even or odd.

In one alternative Alt 1-2-3: $I_1$ equals odd-numbered SD beams, and $I_2$ equals even-numbered SD beams, i.e., $I_2 = \{0, 2, \ldots, \}$, and $I_1 = \{1, 3, \ldots \}$.

In one alternative Alt 1-2-3X: $I_1$ and $I_2$ are as explained in Alt 1-2-3. In addition, the SD beam $i^*$ of the strongest coefficient $c_{l,i^*,m^*}$ is always included in $I_1$ regardless whether it is even or odd.

In one alternative Alt 1-2-3Y: $I_1$ and $I_2$ are as explained in Alt 1-2-3. In addition, the SD beam $i^*$ of the strongest coefficient $c_{l,i^*,m^*}$ is always included in $I_2$ regardless whether it is even or odd.

In one alternative Alt 1-2-4: $I_1$ equals even-numbered SD beams and $I_2$ equals odd-numbered SD beams if the SD beam $i^*$ of the strongest coefficient $c_{l,i^*,m^*}$ is even, i.e., $I_1 = \{0, 2, \ldots, \}$, $I_2 = \{1, 3, \ldots \}$, and $i^* \in I_1$; and $I_1$ equals odd-numbered SD beams and $I_2$ equals even-numbered SD beams if the SD beam $i^*$ of the strongest coefficient $c_{l,i^*,m^*}$ is odd, i.e., $I_2 = \{0, 2, \ldots, \}$, $I_1 = \{1, 3, \ldots \}$, and $i^* \in I_1$.

In one alternative Alt 1-2-5: $I_1$ equals even-numbered SD beams and $I_2$ equals odd-numbered SD beams if the SD beam $i^*$ of the strongest coefficient $c_{l,i^*,m^*}$ is odd, i.e., $I_1 = \{0, 2, \ldots, \}$, $I_2 = \{1, 3, \ldots \}$, and $i^* \in I_2$; and $I_1$ equals odd-numbered SD beams and $I_2$ equals even-numbered SD beams if the FD beam $i^*$ of the strongest coefficient $c_{l,i^*,m^*}$ is even, i.e., $I_2 = \{0, 2, \ldots, \}$, $I_1 = \{1, 3, \ldots \}$, and $i^* \in I_2$.

In one alternative Alt 1-2-6: $I_1$ is reported by the UE ($I_2$ = rest of the SD beams not included in reported $I_1$). In one example, this reporting (of $I_1$) is via a bitmap of length 2 L comprising x ones "1", where the location of ones "1" indicate indices of SD beams included in $I_1$. In another example, this reporting (of $I_1$) is via a bitmap of length 2 L comprising x zeros "0", where the location of zeros "0" indicate indices of SD beams included in $I_1$. In another example, this reporting is via a combinatorial index reporting using $\lceil \log_2 \binom{2L}{x} \rceil$ bits. Here, x is either unrestricted (can take any value from $\{1, \ldots, 2L\}$), or fixed (e.g., L) or higher layer configured or reported by the UE. Also, $I_1$ can be reported via CSI part 1 (multiplexed in UCI part 1) or CSI part 2 wideband (multiplexed in UCI part 2).

In one alternative Alt 1-2-7: $I_1$ is reported by the UE ($I_2$ = rest of the SD beams not included in reported $I_1$) where $I_1$ includes the SD beam $i^*$ of the strongest coefficient $c_{l,i^*,m^*}$. The rest of the details about $I_1$ is the same as in Alt 1-2-6. In particular, the reporting (of $I_1$) is either via a bitmap of length M−1 (minus 1 since $i^*$ is always included in $I_1$), or via a combinatorial index reporting using $$\left\lceil \log_2 \binom{2L-1}{x-1} \right\rceil$$

bits.

In one alternative Alt 1-3: The layer index $l \in \{0, 1, \ldots, v-1\}$ is used for grouping. The group $G_1$ comprises amplitude and phase of NZ coefficients $c_{l,i,m}$ whose layer index $l \in I_1$ and the group $G_2$ comprises amplitude and phase of NZ coefficients $c_{l,i,m}$ whose layer index $l \in I_2$. At least one of the sub-alternatives is used for $I_1$ and $I_2$.

In one alternative Alt 1-3-0: $I_1$ equals a first half of layers, and $I_2$ equals a second half of layers, wherein the first half of layers $$I_1 = \left\{ 0, 1, \ldots, \left\lceil \frac{v}{2} \right\rceil - 1 \right\},$$

and the second half of layers $I_2 =$ $$\left\{ \left\lceil \frac{v}{2} \right\rceil, \left\lceil \frac{v}{2} \right\rceil + 1, \ldots v - 1 \right\}.$$

Alternatively, the first half of layers $$I_1 = \left\{ 0, 1, \ldots, \left\lfloor \frac{v}{2} \right\rfloor - 1 \right\},$$

and the second half of layers $$I_2 = \left\{ \left\lfloor \frac{v}{2} \right\rfloor, \left\lfloor \frac{v}{2} \right\rfloor + 1, \ldots v - 1 \right\}.$$

In one alternative Alt 1-3-1: $I_1$ equals the first layer (layer 0) and $I_2$ equals the remaining layers.

In one alternative Alt 1-4: The bitmap $B_l$ indicating indices of NZ coefficients for each layer $l \in \{0, 1, \ldots, v-1\}$ is used for grouping. At least one of the sub-alternatives is used for $I_1$ and $I_2$.

In one alternative Alt 1-4-0: $I_1$ equals a subset of all FD beam indices m, and $I_2$ equals the remaining FD beam indices such that the absolute value of the difference between the number ($X_1$) of NZ coefficients with FD beams indices in $I_1$ and the number ($X_2$) of NZ coefficients with FD beams indices in $I_2$ is either less than or less or equal to a fixed threshold d, i.e., $|X_1 - X_2| \leq d$ or $|X_1 - X_2| < d$. In one example, d=2 L.

In one alternative Alt 1-4-1: $I_1$ equals a subset of all SD beam indices i, and $I_2$ equals the remaining SD beam indices such that the absolute value of the difference between the number ($X_1$) of NZ coefficients with SD beams indices in $I_1$ and the number ($X_2$) of NZ coefficients with SD beams indices in $I_2$ is either less than or less or equal to a fixed threshold d, i.e., $|X_1-X_2| \leq d$ or $|X_1-X_2| < d$. In one example, d=M.

In one alternative Alt 1-4-2: $I_1$ is the same as Alt 1-4-0 except that $I_1$ includes the FD beam m* of the strongest coefficient $c_{l,i^*,m^*}$.

In one alternative Alt 1-4-3: $I_1$ is the same as Alt 1-4-1 except that $I_1$ includes the SD beam i* of the strongest coefficient $c_{l,i^*,m^*}$.

The notation $\lfloor x \rfloor$ indicates a floor function which maps x to a smaller integer number a such that a is the largest integer such that a<x. Likewise, the notation $\lceil x \rceil$ a ceiling function which maps x to a larger integer number a such that a is the smallest integer such that x<a. Also, the notation |x| indicates the absolute value of x.

In embodiment 1A, which is a variation of embodiment 1 or 1X, the two-part UCI multiplexing process 1600 is used to multiplex and report CSI according to the above-mentioned framework (Eq. 5), wherein:
  CSI part 1 comprising CQI, RI, and $N_0=\Sum_{l=1}^{v} N_{0,l}$ are multiplexed and encoded together in UCI part 1, where $N_0$ indicates the total number of NZ coefficients across v layers; and
  CSI part 2 comprising LI, the first PMI i1 and the second PMI (i2) are multiplexed and encoded together in UCI part 2.

Note that number of NZ coefficients $\{N_{0,l}\}$ for each layer is not reported in UCI part 1, their sum ($N_0$) is reported instead. The rest of the details of embodiment 1 or 1X (including the two segments) are also applicable in this embodiment.

In embodiment 1B, which is a variation of embodiment 1 or 1X, the two-part UCI multiplexing process 1600 is used to multiplex and report CSI as explained in embodiment 1 or 1X except that two groups G1 and G2 comprising the CSI part 2 subband are determined based on ($N_{0,1}, \ldots, N_{0,v}$) reported in UCI part 1. In particular:
  G1: comprises amplitude and phase of a first half of NZ coefficients $c_{l,i,m}$ for all layer $l \in \{1, \ldots, v\}$; and
  G2: comprises amplitude and phase of a second half of NZ coefficients $c_{l,i,m}$ for all layer $l \in \{1, \ldots, v\}$.

Let $N_{0,l,1}$ and $N_{0,l,2}$ respectively be the number of NZ coefficients in the first and second halves of NZ coefficients for layer l. Then, at least one of the following examples is used to determine the values $N_{0,l,1}$ and $N_{0,l,2}$.

$$N_{0,l,1} = \left\lceil \frac{N_{0,l}}{2} \right\rceil \text{ and } N_{0,l,2} = N_{0,l} - N_{0,l,1} = \left\lfloor \frac{N_{0,l}}{2} \right\rfloor \quad \text{Ex 1B-0}$$

$$N_{0,l,1} = \left\lfloor \frac{N_{0,l}}{2} \right\rfloor \text{ and } N_{0,l,2} = N_{0,l} - N_{0,l,1} = \left\lceil \frac{N_{0,l}}{2} \right\rceil \quad \text{Ex 1B-1}$$

$$N_{0,l,2} = \left\lceil \frac{N_{0,l}}{2} \right\rceil \text{ and } N_{0,l,1} = N_{0,l} - N_{0,l,2} = \left\lfloor \frac{N_{0,l}}{2} \right\rfloor \quad \text{Ex 1B-2}$$

$$N_{0,l,2} = \left\lfloor \frac{N_{0,l}}{2} \right\rfloor \text{ and } N_{0,l,1} = N_{0,l} - N_{0,l,2} = \left\lceil \frac{N_{0,l}}{2} \right\rceil \quad \text{Ex 1B-3}$$

For each layer l, the locations or indices of NZ coefficients are known via the respective bitmap reported in CSI part 1 wideband. To determine the two halves of the NZ coefficients, the $N_{0,l}$ NZ coefficients are sorted or numbered according to at least one of the following schemes:

Scheme 1B-0: the $N_{0,l}$ NZ coefficients are sorted or numbered seqentially 0 to $N_{0,l}-1$ first in the 1st dimension (or SD) and then in the 2nd dimension (or FD). For a given NZ coefficient with index ($i^{(k)}, m^{(k)}$), the sorted coefficient index is then given by $n^{(k)}=2L_l m^{(k)}+i^{(k)}$ where the indices $k=0,1,\ldots, N_{0,l}-1$ are assigned such that $n^{(k)}$ increases as k increases;

Scheme 1B-1: the $N_{0,l}$ NZ coefficients are sorted or numbered seqentially 0 to $N_{0,l}-1$ first in the 2nd dimension (or FD) and then in the 1st dimension (or SD). For a given NZ coefficient with index ($i^{(k)}, m^{(k)}$), the sorted coefficient index is then given by $n^{(k)}=M_l i^{(k)}+m^{(k)}$ where the indices $k=0,1,\ldots, N_{0,l}-1$ are assigned such that $n^{(k)}$ increases as k increases.

$2L_l$ and $M_l$ respectively are the number of SD and FD basis vectors for layer l.

Figure 17:
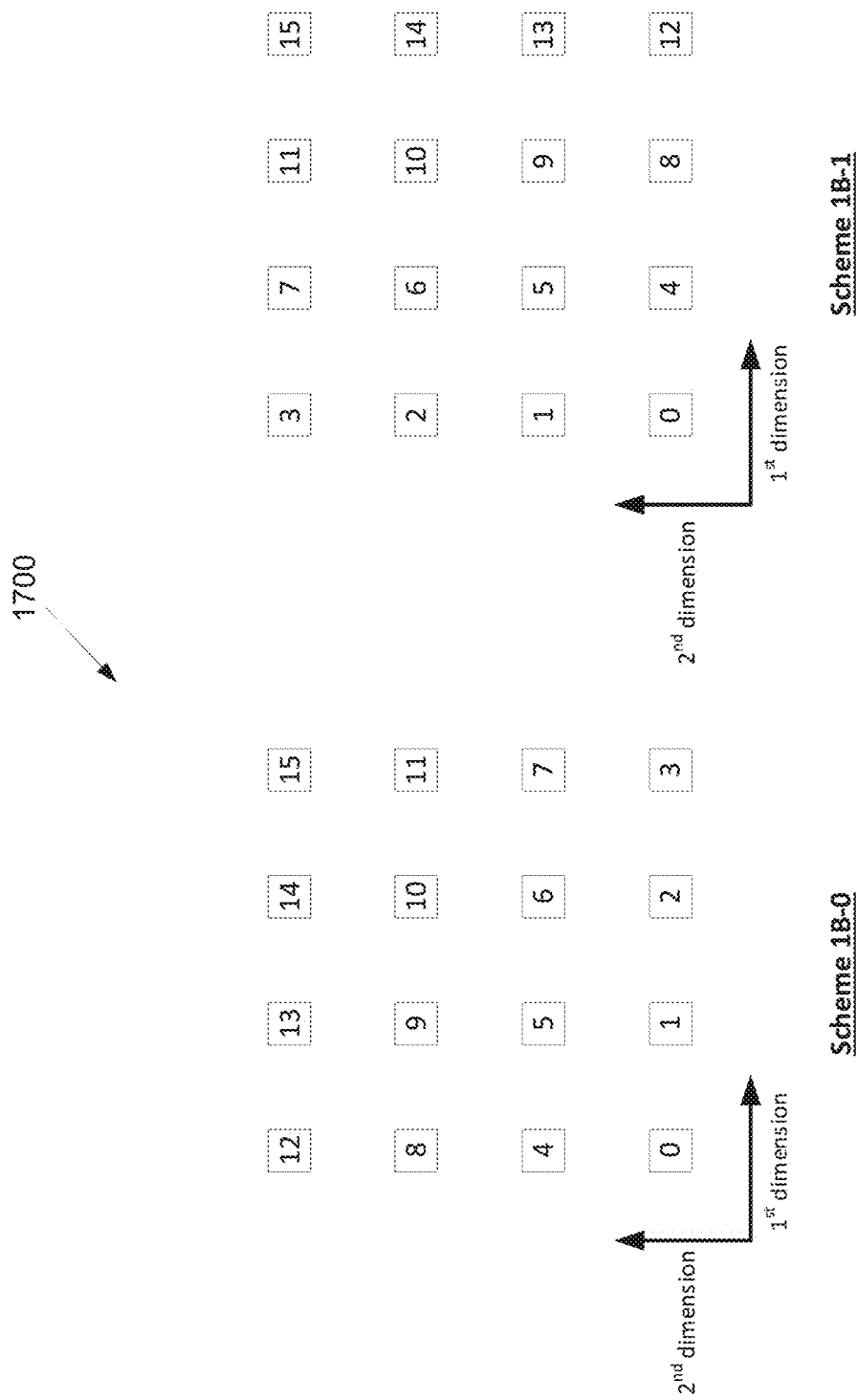
FIG. 17 illustrates an example sorting scheme according to embodiments of the present disclosure.

FIG. 17 illustrates example two beam sorting (numbering) schemes 1700 according to embodiments of the present disclosure. The embodiment of the two beam sorting (numbering) schemes 1700 illustrated in FIG. 17 is for illustration only. FIG. 17 does not limit the scope of this disclosure to any particular implementation of the scheme 1700.

In sub-embodiment 1B-0, which is a variation of embodiment 1B, the two groups are determined as follows:
  G1: for layer l, comprises amplitude and phase of one of the two halves of the NZ coefficients in which the SCI for layer l belongs; and
  G2: for layer l, comprises amplitude and phase of the other of the two halves of the NZ coefficients in which the SCI for layer l does not belong.

For example, G1 and G2 respectively comprise the first and second halves of the SCI belongs to the first half, and G1 and G2 respectively comprise the second and first halves of the SCI belongs to the second half.

In sub-embodiment 1B-1, which is a variation of embodiment 1B, the two groups are determined as follows:
  G1: comprises the SCI and amplitude and phase of a first half of NZ coefficients $c_{l,i,m}$ for all layer $l \in \{1, \ldots, v\}$; and
  G2: comprises amplitude and phase of a second half of NZ coefficients $c_{l,i,m}$ for all layer $l \in \{1, \ldots, v\}$.

In sub-embodiment 1B-2, which is a variation of embodiment 1B, the two groups are determined as follows:
  G1: comprises the SCI and amplitude and phase of a second half of NZ coefficients $c_{l,i,m}$ for all layer $l \in \{1, \ldots, v\}$; and
  G2: comprises amplitude and phase of a first half of NZ coefficients $c_{l,i,m}$ for all layer $l \in \{1, \ldots, v\}$.

In sub-embodiment 1B-3, which is a variation of embodiment 1B, the two groups are determined as follows:
  G1: for layer l, comprises the SCI and amplitude and phase of one of the two halves of the NZ coefficients in which the SCI for layer l belongs; and
  G2: for layer l, comprises amplitude and phase of the other of the two halves of the NZ coefficients in which the SCI for layer l does not belong.

For example, G1 and G2 respectively comprise the first and second halves of the SCI belongs to the first half, and G1 and G2 respectively comprise the second and first halves of the SCI belongs to the second half.

In embodiment 1C, which is a variation of embodiment 1A, the two-part UCI multiplexing process 1600 is used to multiplex and report CSI as explained in embodiment 1A except that two groups G1 and G2 comprising the CSI part 2 subband are determined based on the total (sum) number of NZ coefficients $N_0=\Sum_{l=1}^{v} N_{0,l}$ reported in UCI part 1. In particular:

G1: includes amplitude and phase of a first half of the $N_0$ NZ coefficients $c_{l,i,m}$; and G2: includes amplitude and phase of a second half of the $N_0$ NZ coefficients $c_{l,i,m}$.

Let $N_{0,1}$ and $N_{0,2}$ respectively be the number of NZ coefficients in the first and second halves of the $N_0$ NZ coefficients. Then, at least one of the following examples is used to determine the values $N_{0,1}$ and $N_{0,2}$.

$$N_{0,1} = \left\lceil \frac{N_0}{2} \right\rceil \text{ and } N_{0,2} = N_0 - N_{0,1} = \left\lfloor \frac{N_0}{2} \right\rfloor \quad \text{Ex 1C-0}$$

$$N_{0,1} = \left\lfloor \frac{N_0}{2} \right\rfloor \text{ and } N_{0,2} = N_0 - N_{0,1} = \left\lceil \frac{N_0}{2} \right\rceil \quad \text{Ex 1C-1}$$

$$N_{0,2} = \left\lceil \frac{N_0}{2} \right\rceil \text{ and } N_{0,1} = N_0 - N_{0,2} = \left\lfloor \frac{N_0}{2} \right\rfloor \quad \text{Ex 1C-2}$$

$$N_{0,2} = \left\lfloor \frac{N_0}{2} \right\rfloor \text{ and } N_{0,1} = N_0 - N_{0,2} = \left\lceil \frac{N_0}{2} \right\rceil \quad \text{Ex 1C-3}$$

For each layer l, the locations or indices of NZ coefficients are known via the respective bitmap reported in CSI part 1 wideband. To determine the two halves of the NZ coefficients, the total $N_0$ NZ coefficients are sorted or numbered according to at least one of the following schemes:

Scheme 1C-0: the $N_0$ NZ coefficients are sorted or numbered sequentially 0 to $N_0-1$ in the following order, layer→SD→FD. That is, numbering is first in the layer domain (across layers l=1 ..., v), then in the SD and then in the FD. For a given NZ coefficient with index $(l^{(k)}, i^{(k)}, m^{(k)})$, the sorted coefficient index is then given by $n^{(k)} = 2L_l v m^{(k)} + v i^{(k)} + l^{(k)}$ where the indices k=0,1, ..., $N_0-1$ are assigned such that $n^{(k)}$ increases as k increases;

Scheme 1C-1: the $N_0$ NZ coefficients are sorted or numbered sequentially 0 to $N_0-1$ in the following order, layer→FD→SD. That is, numbering is first in the layer domain (across layers l=1 ..., v), then in the FD and then in the SD. For a given NZ coefficient with index $(l^{(k)}, i^{(k)}, m^{(k)})$, the sorted coefficient index is then given by $n^{(k)} = M_l i^{(k)} + v m^{(k)} + l^{(k)}$ where the indices k=0,1, ..., $N_0-1$ are assigned such that $n^{(k)}$ increases as k increases.

Here $2L_l$ and $M_l$ respectively are number of SD and FD basis vectors for layer l. The rest of the details of embodiment 1A or 1 or 1X (including the two segments) are also applicable in this embodiment.

In sub-embodiment 1C-0, which is a variation of embodiment 1C, the two groups are determined as follows:

G1: comprises the SCI for all layers and amplitude and phase of a first half of the $N_0$ NZ coefficients $c_{l,i,m}$; and G2: comprises amplitude and phase of a second half of the $N_0$ NZ coefficients $c_{l,i,m}$.

In sub-embodiment 1C-1, which is a variation of embodiment 1C, the two groups are determined as follows:

G1: comprises the SCI for all layers and amplitude and phase of a second half of the $N_0$ NZ coefficients $c_{l,i,m}$; and G2: comprises amplitude and phase of a first half of the $N_0$ NZ coefficients $c_{l,i,m}$.

Figure 18:
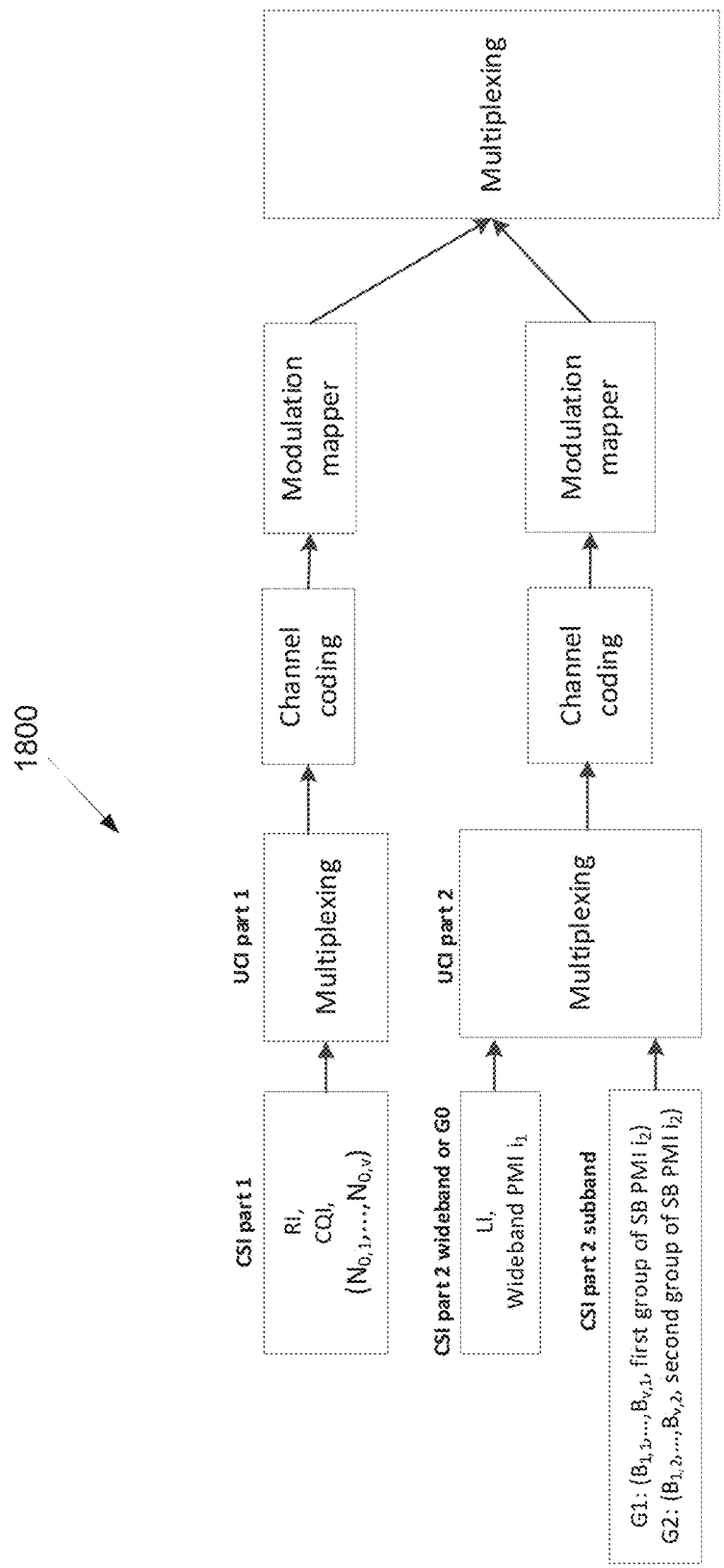
FIG. 18 illustrates an example of a two-part UCI multiplexing process, as may be performed by a UE, according to embodiments of the present disclosure.

FIG. 18 illustrates an example two-part UCI multiplexing process 1800 according to embodiments of the present disclosure, as may be performed by a UE such as UE 116. The embodiment of the two-part UCI multiplexing process 1800 illustrated in FIG. 18 is for illustration only. FIG. 18 does not limit the scope of this disclosure to any particular implementation of the process 1800.

In embodiment 2, as shown in FIG. 18, the two-part UCI multiplexing process 1800 is used to multiplex and report CSI according to the above-mentioned framework (Eq. 5), wherein:

CSI part 1 comprising CQI, RI, and $(N_{0,1}, \ldots, N_{0,v})$ are multiplexed and encoded together in UCI part 1, where $N_{0,l}$ indicates a number of non-zero (NZ) coefficients for layer l; and CSI part 2 comprising LI, the first PMI i1 and the second PMI (i2) are multiplexed and encoded together in UCI part 2.

The CSI part 2 is segmented in two segments:

CSI part 2 wideband: comprising LI, and the first PMI i1 (except the bitmap $B_l$ which is included in CSI part 2 instead); and CSI part 2 subband: comprising the bitmap $B_l$ and the second PMI i2, which are grouped into two groups:

G1: comprising a first bitmap $B_{l,1}$ for all layers l∈{1, ..., v} and a first group of second PMI components (for example, amplitude and phase of a first group of NZ coefficients);

G2: comprising a second bitmap $B_{l,2}$ for all layers l∈{1, ..., v} and a second group of second PMI components (for example, amplitude and phase of a second group of NZ coefficients).

Here, the first bitmap $B_{l,1}$ and the second bitmap $B_{l,2}$ are two parts of the bitmap $B_l$ for layer l. The first group of second PMI components corresponds to amplitude and phase of the first group of NZ coefficients which are indicted via the bitmap $B_{l,1}$, and the second group of second PMI components corresponds to amplitude and phase of the second group of NZ coefficients which are indicted via the bitmap $B_{l,2}$. In one example, $B_l = B_{l,1} B_{l,2}$. In another example, $B_l = B_{l,2} B_{l,1}$.

In one example, the amplitude and phase indices associated with the strongest coefficient(s) are also included in G1 and/or G2. In another example, the amplitude and phase indices associated with the strongest coefficient(s) are excluded from (not included in) G1 and/or G2.

In a variation, LI is not included in UCI part 2 wideband or group G0. In another variation, LI is included in UCI part 1 (not in UCI part 2).

The part 1 UCI may also include CRI if the UE is configured with more than one CSI-RS resources. When cqi-FormatIndicator=widebandCQI, then CQI reported in part 1 UCI corresponds to WB CQI, and when cqi-FormatIndicator=subbandCQI, then CQI reported in part 1 UCI corresponds to WB CQI and SB differential CQI, where WB CQI is reported common for all SBs, and SB differential CQI is reported for each SB, and the number of SBs (or the set of SB indices) is configured to the UE.

In one example, the maximum value of RI is 4. In another example, the maximum value of RI can be more than 4. In this later example, the CQI in UCI part 1 corresponds to up to 4 layers mapped into a first codeword (CW1) or transport block (TB1), and if RI>4, then a second CQI is reported in UCI part 2, which corresponds to additional RI-4 layers mapped into a second codeword (CW2) or transport block (TB2). In one example, the second CQI is included in CSI part 2 wideband. In another example, the second CQI is included in CSI part 2 subband. In one example, the second CQI is included in CSI part 2 wideband. In another example, when cqi-FormatIndicator=subbandCQI, then the second CQI comprises a WB second CQI included in CSI part 2 wideband and SB differential second CQI included in CSI part 2 subband.

Based on the value of the reported $(N_{0,1}, \ldots, N_{0,v})$ in part 1, the CSI reporting payload (bits) for part 2 is determined. In particular, the components of the second PMI $i_2$ are reported only for the coefficients that are non-zero.

Figure 19:
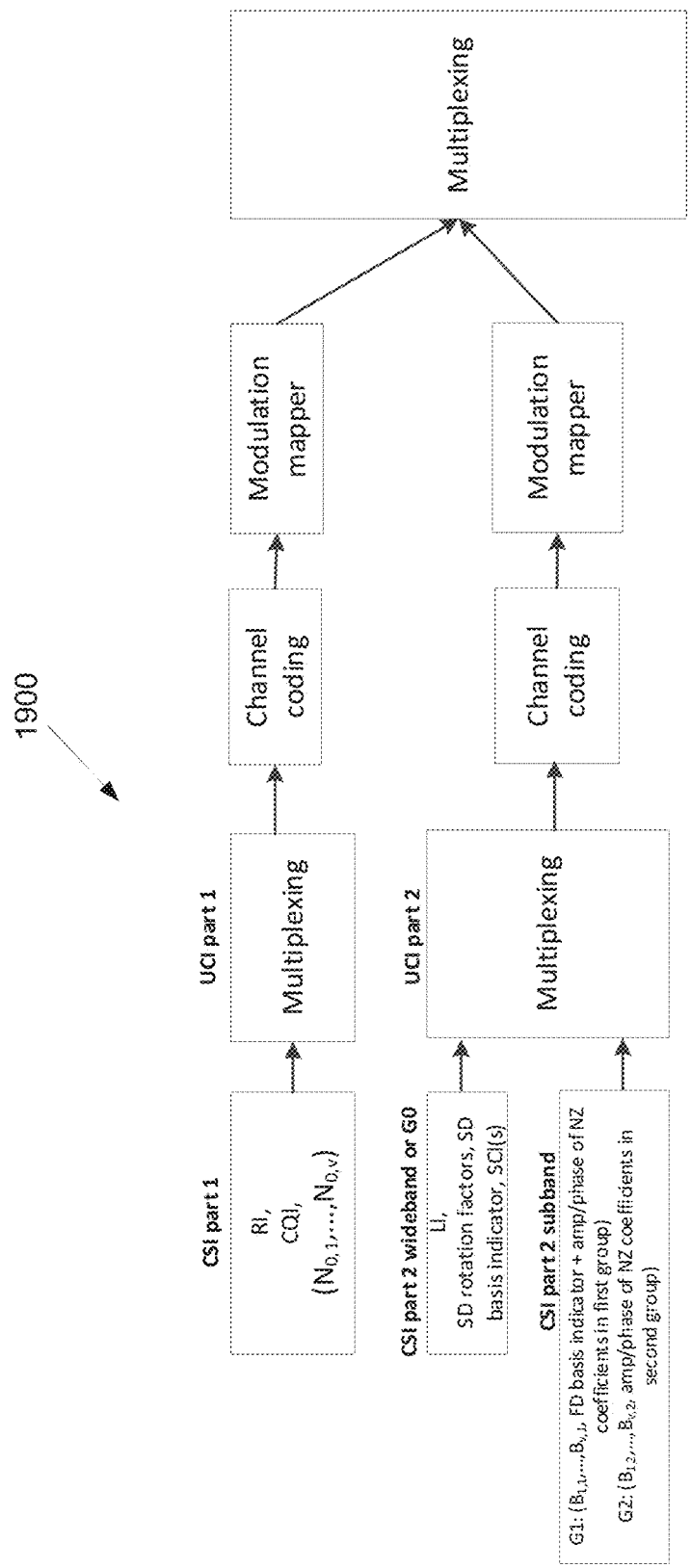
FIG. 19 illustrates an example of a two-part UCI multiplexing process, as may be performed by a UE, according to embodiments of the present disclosure.

FIG. 19 illustrates an example two-part UCI multiplexing process 1900 according to embodiments of the present disclosure, as may be performed by a UE such as UE 116. The embodiment of the two-part UCI multiplexing process 1900 illustrated in FIG. 19 is for illustration only. FIG. 19 does not limit the scope of this disclosure to any particular implementation of the process 1900.

In embodiment 2X, as shown in FIG. 19, the CSI part 2 comprised in the two-part UCI multiplexing process 1900 is segmented in two segments or three groups:

CSI part 2 wideband or group G0: comprising LI, and SD rotation factors indicating (q1, q2, q3), SD basis indicator indicating L beam selection for $W_1$, and SCI(s) (indicated via the first PMI i1); and CSI part 2 subband: comprising the bitmap $B_l$ and the second PMI i2, which are grouped into two groups:

G1: comprising a first bitmap $B_{l,1}$ for all layers $l \in \{1, \ldots, v\}$ and a first group of second PMI components (for example, amplitude and phase of a first group of NZ coefficients), and FD indicator indicating M beam selection for $W_f$ (indicated via the first PMI i1,2);

G2: comprising a second bitmap $B_{l,2}$ for all layers $l \in \{1, \ldots, v\}$ and a second group of second PMI components (for example, amplitude and phase of a second group of NZ coefficients).

The rest of the details of embodiment 2 are also applicable in this embodiment.

The two groups, G1 and G2, in embodiment 2 or 2X are determined based on at least one of the alternatives (Alt 1-0 through Alt 1-4) in embodiment 1 or 1X or 1B, or 1C or one of their sub-embodiments except that each group also includes the corresponding bitmaps $B_{l,1}$ and $B_{l,2}$. For instance, the details about the bitmaps $B_{l,1}$ and $B_{l,2}$ are according to at least one of the following alternatives.

In one alternative Alt 2-0-0: $B_{l,1}=B_{l,1,row}B_{l,1,col}$ or $B_{l,1,col}B_{l,1,row}$, where $B_{l,1,row}$ is a bitmap of length M and $B_{l,1,col}$ is a bitmap of length 2 L; and $B_{l,2}$ is a bitmap of length (2L−1)(M−1).

In one alternative Alt 2-0-1: $B_{l,1}$ is a bitmap of length M; and $B_{l,2}$ is a bitmap of length 2 L(M−1).

In one alternative Alt 2-0-2: $B_{l,1}$ is a bitmap of length 2 L; and $B_{l,2}$ is a bitmap of length (2L−1)M.

In one alternative Alt 2-1: $B_{l,1}$ is a bitmap of length 2Lx; and $B_{l,2}$ is a bitmap of length 2 L(M−x), where x is number of indices included in $I_1$.

In one alternative Alt 2-2: $B_{l,1}$ is a bitmap of length Mx; and $B_{l,2}$ is a bitmap of length M(2 L−x), where x is number of indices included in $I_1$.

In one alternative Alt 2-3: $B_{l,1}=B_l$ is the bitmap for layer l if l is included in $I_1$, and $B_{l,1}$ is not included in $G_1$ otherwise. Likewise, $B_{l,2}=B_l$ is the bitmap for layer l if l is included in $I_2$, and $B_{l,2}$ is not included in $G_2$ otherwise.

In one alternative Alt 2-4: $B_{l,1}$ is a bitmap of length 2Lx; and $B_{l,2}$ is a bitmap of length 2 L(M−x), where x is number of indices included in $I_1$. Or, $B_{l,1}$ is a bitmap of length Mx; and $B_{l,2}$ is a bitmap of length M(2 L−x), where x is number of indices included in $I_1$.

In embodiment 2A, which is a variation of embodiment 2 or 2X, the two-part UCI multiplexing process 1900 is used to multiplex and report CSI according to above-mentioned framework (Eq. 5), wherein:

CSI part 1 comprising CQI, RI, and $N_0 = \sum_{l=1}^{v} N_{0,l}$ are multiplexed and encoded together in UCI part 1, where $N_0$ indicates the total number of NZ coefficients across v layers; and CSI part 2 comprising LI, the first PMI i1 and the second PMI (i2) are multiplexed and encoded together in UCI part 2.

Note that the number of NZ coefficients $\{N_{0,l}\}$ for each layer is not reported in UCI part 1, their sum $(N_0)$ is reported instead. The rest of the details of embodiment 2 or 2X (including the two segments) is also applicable here.

In embodiment 3, the following quantization scheme is used to quantize/report amplitude and phase of the $K_{NZ}$ NZ coefficients. The UE reports the following for the quantization of the NZ coefficients in $\tilde{W}_2$:

A $\lceil \log_2 X \rceil$-bit indicator for the strongest coefficient index (i*, m*). In one example, $X=K_{NZ}$.

Strongest coefficient $c_{l,i^*,m^*}=1$ (hence its amplitude/phase are not reported)

Two antenna polarization-specific reference amplitudes:

For the polarization associated with the strongest coefficient $c_{l,i^*,m^*}=1$, since the reference amplitude $p_{l,i,m}^{(1)}=1$, it is not reported For the other polarization, reference amplitude $p_{l,i,m}^{(1)}$ is quantized to A bits.

In one example, A=4, and the 4-bit amplitude alphabet is $$\left\{1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{14}}\right)^{\frac{1}{4}}, 0\right\}.$$

For $\{c_{l,i,m}, (i, m) \neq (i^*, m^*)\}$:

For each polarization, differential amplitudes $p_{l,i,m}^{(2)}$ of the coefficients calculated relative to the associated polarization-specific reference amplitude and quantized to B bits.

In one example, B=3, and the 3-bit amplitude alphabet is $$\left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\}.$$

Note: The final quantized amplitude $p_{l,i,m}$ is given by $p_{l,i,m}^{(1)} \times p_{l,i,m}^{(2)}$ and the coefficient is given by $$c_{l,i,m} = p_{ref}\left(\left\lfloor \frac{i}{L} \right\rfloor\right) \times p_{l,i,m}^{(2)} \times \varphi(l, m).$$

Note that $$p_{l,i,m}^{(1)} = p_{ref}\left(\left\lfloor \frac{i}{L} \right\rfloor\right).$$

In one alternative, "zero" in the 4-bit amplitude alphabet for the reference amplitude is removed and the associated code point is designated as "reserved" which implies that the associated code point is not used in reference amplitude reporting. For RI∈{2,3,4}, different layers are independently quantized.

Each phase is quantized to either 8PSK (3-bit) or 16PSK (4-bit) (which is configurable). Note that the reference amplitude $p_{l,i,m}^{(1)}$ is not reported for the antenna polarization (at the gNB) associated with the strongest coefficient and an A-bit reference amplitude $p_{l,i,m}^{(1)}$ is reported for the other antenna polarization. The reporting of this reference amplitude for the other antenna polarization is according to at least one of the following alternatives.

In one alternative Alt 3-0: the reference amplitude for the other antenna polarization is reported via UCI part 1. In one example, this reporting is separately as a separate UCI part 1 parameter (CSI part 1 parameter). In another example, this reporting is jointly with another UCI part 1 parameter (CSI part 1 parameter). For example, the reference amplitude can be reported jointly with the number of NZ coefficients reported in UCI part 1.

In one alternative Alt 3-1: the reference amplitude for the other antenna polarization is reported via UCI part 2 wideband. In one example, this reporting is separately as a separate UCI part 2 wideband parameter (CSI part 2 wideband parameter). In another example, this reporting is jointly with another UCI part 2 wideband parameter (CSI part 2 wideband parameter). For example, the reference amplitude can be reported jointly with the SCI reported in UCI part 2 wideband.

In one alternative Alt 3-2: the reference amplitude for the other antenna polarization is reported via UCI part 2 subband G1 or first segment or first group. In one example, this reporting is separately as a separate UCI part 2 subband parameter (CSI part 2 subband parameter). In another example, this reporting is jointly with another UCI part 2 subband parameter (CSI part 2 subband parameter). For example, the reference amplitude can be reported jointly with the differential amplitude reported in UCI part 2 subband.

In one alternative Alt 3-3: the reference amplitude for the other antenna polarization is reported via UCI part 2 subband G2 or second segment or second group. In one example, this reporting is separately as a separate UCI part 2 subband parameter (CSI part 2 subband parameter). In another example, this reporting is jointly with another UCI part 2 subband parameter (CSI part 2 subband parameter). For example, the reference amplitude can be reported jointly with the differential amplitude reported in UCI part 2 subband.

Let us denote the non-zero (NZ) coefficient associated with layer l∈{0,1, ..., v−1}, SD beam/basis i∈{0,1, ..., 2L−1}, and FD beam/basis m∈{0,1, ..., $M_v$} as $c_{l,i,m}$ and the associated bitmap component (including zero(s)) as $b_{l,i,m}$. As explained in some embodiments of this disclosure, the parameters in UCI Part 2 is divided into 3 groups, where Group $G_n$ is of a higher priority than Group $G_{n+1}$, where n=0,1.

In embodiment 4, the UE is configured to report CSI via the two-part UCI multiplexing process 1900 according to a combination of embodiment 1X/1C and Alt 3-2, wherein:
- Group $G_0$ includes at least SD rotation factors, SD basis indicator, and SCI(s);
- Group $G_1$ includes at least reference amplitude for weaker polarization (cf. Alt 3-2), amplitude and phase of NZ coefficients in {$c_{l,i,m}$: (l, i, m)∈$G_1$}, and FD basis indicator; and
- Group $G_2$ includes at least amplitude and phase of NZ coefficients in {$c_{l,i,m}$: (l, i, m)∈$G_2$}.

In one example, the amplitude and phase indices associated with the strongest coefficient(s) are also included in G1 and/or G2. In another example, the amplitude and phase indices associated with the strongest coefficient(s) are excluded from (not included in) G1 and/or G2.

In a variation, LI is not included in group G0. In another variation, LI is included in UCI part 1 (not in G0).

The priority rule for determining G1 and G2 is according to at least one of the following alternatives.

In one alternative Alt 4-0, the NZ LC coefficients are prioritized from high to low priority according to (l, i, m) index triplet. The $\lceil N_0/2 \rceil$ highest priority coefficients belong to G1 and the $\lfloor N_0/2 \rfloor$ lowest priority coefficients belong to G2. The priority level is calculated as P(l, i, m)=2L·v·$F_1$(m)+v·$F_2$(i)+l, where $F_1$ and $F_2$ are fixed permutation functions for FD and SD indices. Note that $F_1$(m)=m if there is no permutation in FD. Likewise, $F_2$(i)=i if there is no permutation in SD. In one example, the permutation function $F_1$ is such that FD indices 0,1, ..., M−1 are permuted to 0, M−1, 1, M−2, 2, M−3, ..., which implies that FD basis indices in the middle or centre have lower priority, hence they will be dropped first. In another example, the permutation function $F_1$ is given by $$F_1(m) = (-1)^m \cdot m + \frac{1-(-1)^m}{2} M.$$

In one example, the permutation function $F_2$ is such that FD indices 0,1, ..., 2L−1 are permuted to l*, l*+L, l*+1, l*+L+1, ..., where l* is the SD index of the strongest coefficient.

In one alternative Alt 4-1, the NZ coefficients are sorted sequentially 0 to $N_0$−1 according to Scheme 1C-0 or 1C-1. The group $G_1$ comprises at least first $\lceil N_0/2 \rceil$ sorted coefficients, and group $G_2$ comprises the remaining second sorted coefficients.

In one alternative Alt 4-2, the LC coefficients are prioritized from high to low priority according to (l, i, m) index triplet. The $\lceil N_0/2 \rceil$ highest priority coefficients belong to G1 and the $\lfloor N_0/4L \rfloor \times 2$ L lowest priority coefficients belong to G2. The priority level is calculated as P(l, i, m) defined in Alt 4-0.

The bitmap {$b_{l,i,m}$} is included in at least one of the three groups according to at least one of the following alternatives (cf. embodiment 2 or 2X).

In one alternative Alt 4-3, the first v·2LM−X bits according to P(l, i, m) value (i.e., high priority coefficients) belong in $G_1$, and the last X according to P(l, i, m) value (i.e., low priority coefficients) belong in $G_2$. In one example, this alternative is coupled with Alt 4-0. In one example, $$X = \frac{N_0}{2}.$$

In another example, $$X = \left\lfloor \frac{N_0}{2} \right\rfloor.$$

In another example, $$X = \left\lceil \frac{N_0}{2} \right\rceil.$$

In one alternative Alt 4-4, the bitmap and coefficients are segmented together into M segments (where M=number of FD basis indices). The group $G_1$ contains $M_1$ segments and the group $G_2$ contains $M_2$ segments, where $M=M_1+M_2$. In one example, each segment contains the bitmap (or a part of the bitmap) associated with all RI=v layers, all SD components and a single FD component (with index the same as the segment) and the corresponding amplitude/phase of coefficients. The payload size of $G_1$ is given by v·2LM+XT, where T=number of bits for amplitude and phase. The payload size of $G_2$ is X(a+b). In one example, this alternative is coupled with Alt 4-1. In one example, $$X = \frac{N_0}{2}.$$

In another example, X=. In another example, $$X = \left\lceil \frac{N_0}{2} \right\rceil.$$

In one alternative Alt 4-5, the first v·2LM−⌊$N_0$/4L⌋×2 L bits according to P(l, i, m) value belong in $G_1$, and the last ⌊$N_0$/4L⌋×2 L according to P(l, i, m) value belong in $G_2$. In one example, this alternative is coupled with Alt 4-2.

In one alternative Alt 4-6, first v·LM bits according to P(l, i, m) value belong in $G_1$, and the last v·LM according to P(l, i, m) value belong in $G_2$. In one example, this alternative is coupled with Alt 4-0.

In Alt 4-7, the bitmap $\{b_{l,i,m}\}$ is included in $G_0$.

In Alt 4-8, the bitmap $\{b_{l,i,m}\}$ is included in $G_1$.

In embodiment A, when CSI reporting on PUSCH (or, optionally on PUCCH) comprises two parts, Part 1 CSI and Part 2 CSI, the UE may omit (hence does not report) a portion of the Part 2 CSI. Omission of Part 2 CSI is according to the priority order shown in Table 1 or Table 2, where $N_{Rep}$ is the number of CSI reports configured to be carried on the PUSCH. Priority 0 is the highest priority and priority $2N_{Rep}$ is the lowest priority and the CSI report n corresponds to the CSI report with the nth smallest $Pri_{iCSI}(y, k, c, s)$ value among the $N_{Rep}$ CSI reports.

CSI reports are associated with a priority value $Pri_{iCSI}(y, k, c, s) = 2 \cdot N_{cells} \cdot M_s \cdot y + N_{cells} \cdot M_s \cdot k + M_s \cdot c + s$ where:

y=0 for aperiodic CSI reports to be carried on PUSCH
y=1 for semi-persistent CSI reports to be carried on PUSCH, y=2 for semi-persistent CSI reports to be carried on PUCCH and y=3 for periodic CSI reports to be carried on PUCCH;

k=0 for CSI reports carrying L1-RSRP and k=1 for CSI reports not carrying L1-RSRP;

c is the serving cell index and $N_{cells}$ is the value of the higher layer parameter maxNrofServingCells;

s is the reportConfigID and $M_s$ is the value of the higher layer parameter maxNrofCSI-ReportConfigurations.

A first CSI report is said to have priority over a second CSI report if the associated $Pri_{iCSI}(y, k, c, s)$ value is lower for the first report than for the second report.

The subbands for a given CSI report n indicated by the higher layer parameter csi-ReportingBand are numbered continuously in increasing order with the lowest subband of csi-ReportingBand as subband 0. When omitting Part 2 CSI information for a particular priority level, the UE shall omit all of the information at that priority level.

TABLE 1

Priority reporting levels for Part 2 CSI

Priority 0:
Part 2 wideband CSI for CSI reports 1 to $N_{Rep}$
Priority 1:
Part 2 subband CSI of $G_1$ for CSI report 1
Priority 2:
Part 2 subband CSI of $G_2$ for CSI report 1
Priority 3:
Part 2 subband CSI of $G_1$ for CSI report 2
Priority 4:
Part 2 subband CSI of $G_2$ for CSI report 2
.
.
.
Priority $2N_{Rep}$ − 1:
Part 2 subband CSI of $G_1$ for CSI report $N_{Rep}$
Priority $2N_{Rep}$:
Part 2 subband CSI of $G_2$ for CSI report $N_{Rep}$ Where:
$G_1$=the first group, and $G_2$=the second group, as proposed in this disclosure, if the CSI report is configured to be according to the FD compression framework (Eq. 5); and $G_1$=even subbands, and $G_2$=odd subbands; otherwise (if the CSI report is configured to comprise subband CSI for each subband independently, i.e., without any FD compression).

TABLE 2

Priority reporting levels for Part 2 CSI

Priority 0:
Part 2 G0 CSI for CSI reports 1 to $N_{Rep}$
Priority 1:
Part 2 subband CSI of $G_1$ for CSI report 1
Priority 2:
Part 2 subband CSI of $G_2$ for CSI report 1
Priority 3:
Part 2 subband CSI of $G_1$ for CSI report 2
Priority 4:
Part 2 subband CSI of $G_2$ for CSI report 2
.
.
.
Priority $2N_{Rep}$ − 1:
Part 2 subband CSI of $G_1$ for CSI report $N_{Rep}$
Priority $2N_{Rep}$:
Part 2 subband CSI of $G_2$ for CSI report $N_{Rep}$ Where:
$G_0$=the first group, $G_1$=the second group, and $G_2$=the third group, as proposed in this disclosure, if the CSI report is configured to be according to the FD compression framework (Eq. 5); and $G_0$=wideband, $G_1$=even subbands, and $G_2$=odd subbands; otherwise (if the CSI report is configured to comprise subband CSI for each subband independently, i.e., without any FD compression).

When the UE is scheduled to transmit a transport block on PUSCH multiplexed with a CSI report(s), Part 2 CSI is omitted only when $$\left\lceil (O_{CSI-2} + L_{CSI-2}) \cdot \beta_{offset}^{PUSCH} \cdot \sum_{l=0}^{N_{symb,all}^{PUSCH}-1} M_{sc}^{UCI}(l) / \sum_{r=0}^{C_{UL-SCH}-1} K_r \right\rceil$$

is larger than $$\left\lfloor \alpha \cdot \sum_{l=0}^{N_{symb,all}^{PUSCH}-1} M_{SC}^{UCI}(l) \right\rfloor - Q'_{ACK} - Q'_{CSI-1},$$

where parameters $O_{CSI-2}$, $L_{CSI-2}$, $\beta_{offset}^{PUSCH}$, $N_{symball}^{PUSCH}$, $M_{sc}^{UCI}(l)$, $C_{UL-SCH}$, $K_r$, $Q'_{CSI-1}$, $Q'_{ACK}$ and $\alpha$ are defined.

Part 2 CSI is omitted level by level, beginning with the lowest priority level until the lowest priority level is reached which causes the $$\left\lceil (O_{CSI-2} + I_{CSI-2}) \cdot \beta_{offset}^{PUSCH} \cdot \sum_{l=0}^{N_{symb,all}^{PUSCH}-1} M_{sc}^{UCI}(l) / \sum_{r=0}^{C_{UL-SCH}-1} K_r \right\rceil$$

to be less than or equal to $$\left\lfloor \alpha \cdot \sum_{l=0}^{N_{symb,all}^{PUSCH}-1} M_{SC}^{UCI}(l) \right\rfloor - Q'_{ACK} - Q'_{CSI-1}.$$

When part 2 CSI is transmitted on PUSCH with no transport block, lower priority bits are omitted until Part 2 CSI code rate is below a threshold code rate $c_T$ lower than one, where:

$$c_T = \frac{R}{\beta_{offset}^{CSI-part2}}$$

$\beta_{offset}^{CSI-part2}$ is the CSI offset value

R is signaled code rate in DCI

In a variation, the omission of Part 2 CSI is according to the priority order shown in Table 3.

TABLE 3

| Priority reporting levels for Part 2 CSI |
|---|
| Priority 0: |
| Part 2 wideband CSI for CSI reports 1 to $N_{Rep}$ |
| Priority 1: |
| Part 2 subband CSI of $G_1$ for CSI report 1 |
| Priority 2: |
| Part 2 subband CSI of $G_1$ for CSI report 2 |
| . |
| . |
| Priority $N_{Rep}$: |
| Part 2 subband CSI of $G_1$ for CSI report $N_{Rep}$ |
| Priority $N_{Rep}$ + 1: |
| Part 2 subband CSI of $G_2$ for CSI report 1 |
| Priority $N_{Rep}$ + 2: |

TABLE 3-continued

| Priority reporting levels for Part 2 CSI |
|---|
| Part 2 subband CSI of $G_2$ for CSI report 2 |
| . |
| . |
| Priority $2N_{Rep}$: |
| Part 2 subband CSI of $G_2$ for CSI report $N_{Rep}$ |

In embodiment B, when CSI reporting on PUSCH (or, optionally on PUCCH) comprises two parts, Part 1 CSI and Part 2 CSI, the UE may omit (hence does not report) a portion of the Part 2 CSI. The information whether a portion of the Part 2 CSI is omitted is reported by the UE as a part of the CSI part. In particular, this reporting is via a x-bit indication in UCI part 1. Once the gNB decodes UCI part 1, it knows the information about the omission of UCI part 2. At least one of the following alternatives is used for the x-bit indication.

In one alternative Alt B-0: x=1 and the 1-bit indication indicates (A) no omission, i.e., the full UCI part 2 is reported or (B) partial omission, where the partial omission is fixed (e.g., UCI part 2 subband is omitted).

In one alternative Alt B-1: x=1 and the 1-bit indication indicates (A) no omission, i.e., the full UCI part 2 is reported or (C) full omission, i.e., the whole UCI part 2 is omitted (not reported).

In one alternative Alt B-2: x=1 and the 1-bit indication indicates (B) partial omission, where the partial omission is fixed (e.g., UCI part 2 subband is omitted) or (C) full omission, i.e., the whole UCI part 2 is omitted (not reported).

In one alternative Alt B-3: x=2 and the 2-bit indication indicates (A) no omission, i.e., the full UCI part 2 is reported or (B) partial omission, where the partial omission is fixed (e.g., UCI part 2 subband is omitted) or (C) full omission, i.e., the whole UCI part 2 is omitted (not reported).

In one alternative Alt B-4: x=2 and the 2-bit indication indicates (A) no omission, i.e., the full UCI part 2 is reported or (B1) partial omission 1, where the partial omission 1 is fixed (e.g., UCI part 2 subband group 2 G2 is omitted) or (B2) partial omission 2, where the partial omission 2 is fixed (e.g., UCI part 2 subband is omitted, i.e., both G1 and G2 are omitted) or (C) full omission, i.e., the whole UCI part 2 is omitted (not reported).

Here the two groups G1 and G2 are according to at least one embodiment/alternative/example in this disclosure.

Any of the above variation embodiments can be utilized independently or in combination with at least one other variation embodiment.

Figure 20:
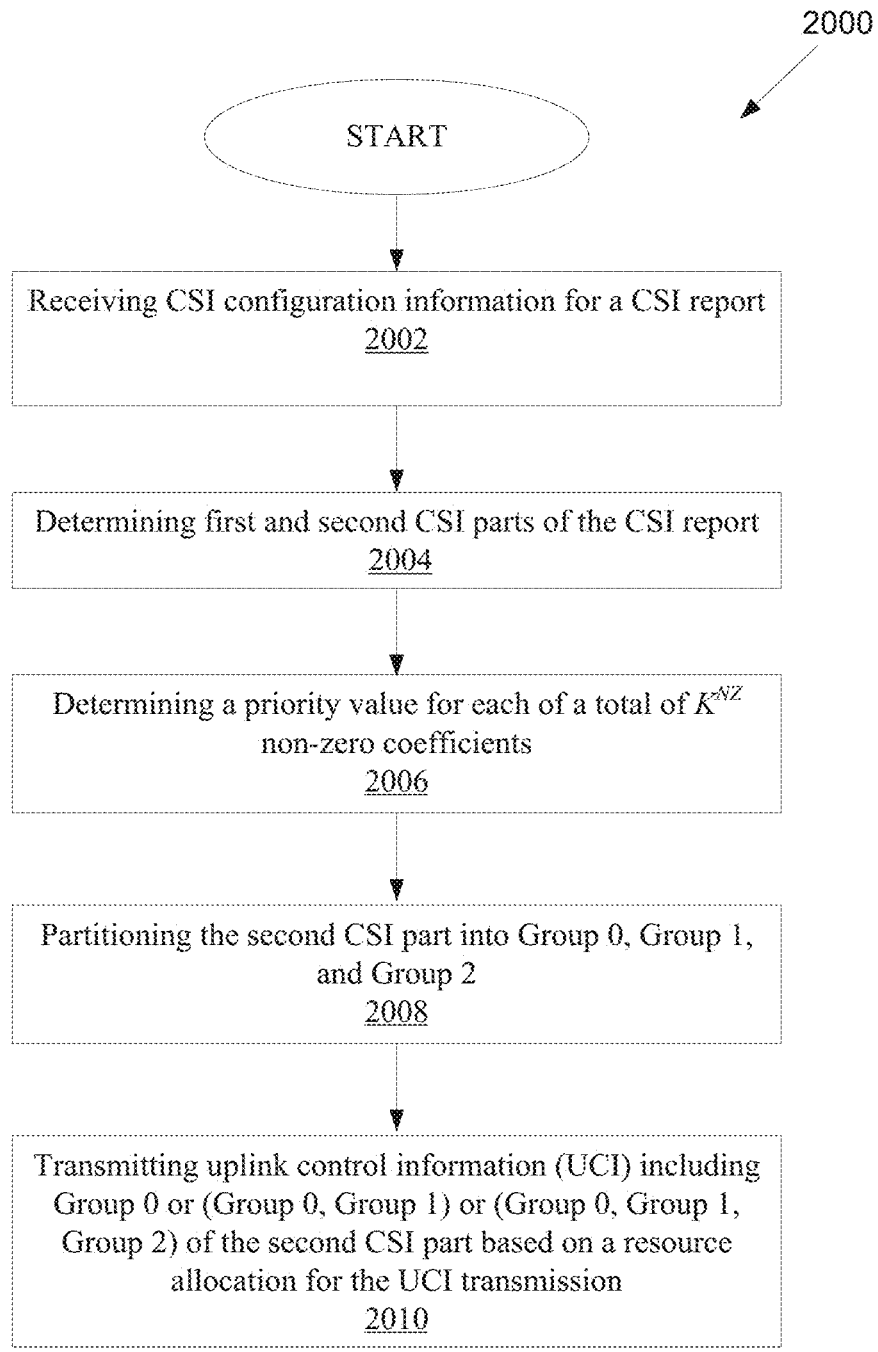
FIG. 20 illustrates a flow chart of a method for transmitting an UL transmission including CSI reporting, as may be performed by a UE according to embodiments of the present disclosure.

FIG. 20 illustrates a flow chart of a method 2000 for operating a user equipment (UE) for channel state information (CSI) reporting in a wireless communication system, as may be performed by a UE such as UE 116, according to embodiments of the present disclosure. The embodiment of the method 2000 illustrated in FIG. 20 is for illustration only. FIG. 20 does not limit the scope of this disclosure to any particular implementation.

As illustrated in FIG. 20, the method 2000 begins at step 2002. In step 2002, the UE (e.g., 111-116 as illustrated in FIG. 1) receives, from a base station (BS), configuration information for a CSI report, where the CSI report the UE is to generate comprises a first CSI part and a second CSI part.

In step 2004, the UE determines the first and the second CSI parts of the CSI report. The second CSI part includes a total of $K^{NZ}$ non-zero coefficients across $\upsilon$ layers, where $\upsilon \geq 1$ is a rank value.

In step 2006, the UE determines a priority value for each of the total of $K^{NZ}$ non-zero coefficients.

In step 2008, the UE partitions the second CSI part into Group 0, Group 1, and Group 2 such that, based on the determined priority values of the total of $K^{NZ}$ non-zero coefficients, indicators to non-zero coefficients having higher priority values are included in Group 1 and indicators to non-zero coefficients having lower priority values are included in Group 2.

In step 2010, the UE transmits, to the BS over an uplink (UL) channel, UL control information (UCI) including Group 0 or (Group 0, Group 1) or (Group 0, Group 1, Group 2) of the second CSI part based on a resource allocation for the UCI transmission.

An indicator to a non-zero coefficient includes an amplitude coefficient indicator and a phase coefficient indicator that indicates an amplitude and phase of the non-zero coefficient, respectively.

In one embodiment, a number of indicators included in Group 1 and Group 2 is $$\left\lceil \frac{K^{NZ}}{2} \right\rceil \text{ and } \left\lfloor \frac{K^{NZ}}{2} \right\rfloor,$$

respectively, where $\lceil \ \rceil$ is a ceiling function and $\lfloor \ \rfloor$ is a flooring function.

In one embodiment, $K^{NZ} = \sum_{l=1}^{\upsilon} K_l^{NZ}$, and for each layer $l=1, \ldots, \upsilon$, $K_l^{NZ}$ is a number of non-zero coefficients for layer l, the $K_l^{NZ}$ non-zero coefficients correspond to non-zero coefficients of a 2L×M coefficient matrix $C_l$ comprising 2 L rows and M columns, and the remaining $2LM-K_l^{NZ}$ coefficients of the 2L×M coefficient matrix $C_l$ are zero, and the priority value for a coefficient $c_{l,i,m}$ of the coefficient matrix $C_l$ is determined based on layer index (l), row index (i), and column index (m) associated with the coefficient $c_{l,i,m}$.

In one embodiment, the priority value for a coefficient $c_{l,i,m}$ is given by $P(l, i, m) = 2 \times L \times \upsilon \times F_1(m) + \upsilon \times F_2(i) + l$, wherein the coefficient $c_{l,i,m}$ with a highest priority value has a lowest associated value $P(l, i, m)$, and $F_1$ and $F_2$ are fixed permutation functions for indices m and i, respectively.

In one embodiment, $F_2(i) = i$.

In one embodiment, for each layer $l=1, \ldots, \upsilon$, a bit sequence comprising 2LM bits to indicate indices (i, m) of the $K_l^{NZ}$ non-zero coefficients is determined, and based on the determined priority values of the total of $K^{NZ}$ non-zero coefficients, a total of $\upsilon \times 2LM$ bits across $\upsilon$ layers are partitioned into a first bit sequence and a second bit sequence, wherein indicators to the first bit sequence having a higher priority are included in Group 1 and indicators to the second bit sequence having a lower priority are included in Group 2.

In one embodiment, the first and second bit sequences comprise $$\upsilon \times 2LM - \left\lfloor \frac{K^{NZ}}{2} \right\rfloor$$

bits and $$\left\lfloor \frac{K^{NZ}}{2} \right\rfloor$$

bits, respectively, where $\lfloor \ \rfloor$ is a flooring function.

In one embodiment, for each layer $l=1, \ldots, \upsilon$, an indicator included in Group 0 that indicates an index $(i^*_l, m^*_l)$ of a strongest coefficient $c_{l,i_l^*,m_l^*} = 1$ is determined.

In one embodiment, for each layer $l=1, \ldots, \upsilon$, an indicator included in Group 1 that indicates a reference amplitude coefficient that is common for all non-zero coefficients $c_{l,i,m}$ whose index i is such that $$\left\lfloor \frac{i}{L} \right\rfloor \neq \left\lfloor \frac{i_l^*}{L} \right\rfloor,$$

where $\lfloor \ \rfloor$ is a flooring function, is determined.

In one embodiment, an indicator included in Group 0 that indicates a set of L spatial domain basis vectors comprising columns of $A = [a_0 \ a_1 \ldots a_{L-1}]$ is determined, and for each layer $l=1, \ldots, \upsilon$, an indicator included in Group 1 that indicates a set of M frequency domain (FD) basis vectors comprising columns of $B_l = [b_{l,0} \ b_{l,1} \ldots b_{l,M-1}]$ is determined, wherein A, $B_l$, and $C_l$ indicate a precoding matrix for each FD unit of a total number ($N_3$) of FD units determined by columns of $$W = \frac{1}{\sqrt{\upsilon}} [W^1 \ W^2 \ \ldots \ W^\upsilon],$$

where $$W^l = \begin{bmatrix} A & 0 \\ 0 & A \end{bmatrix} C_l B_l^H = \begin{bmatrix} \sum_{m=0}^{M-1} \sum_{i=0}^{L-1} c_{l,i,m}(a_i b_{l,m}^H) \\ \sum_{m=0}^{M-1} \sum_{i=0}^{L-1} c_{l,i+L,m}(a_i b_{l,m}^H) \end{bmatrix}.$$

Figure 21:
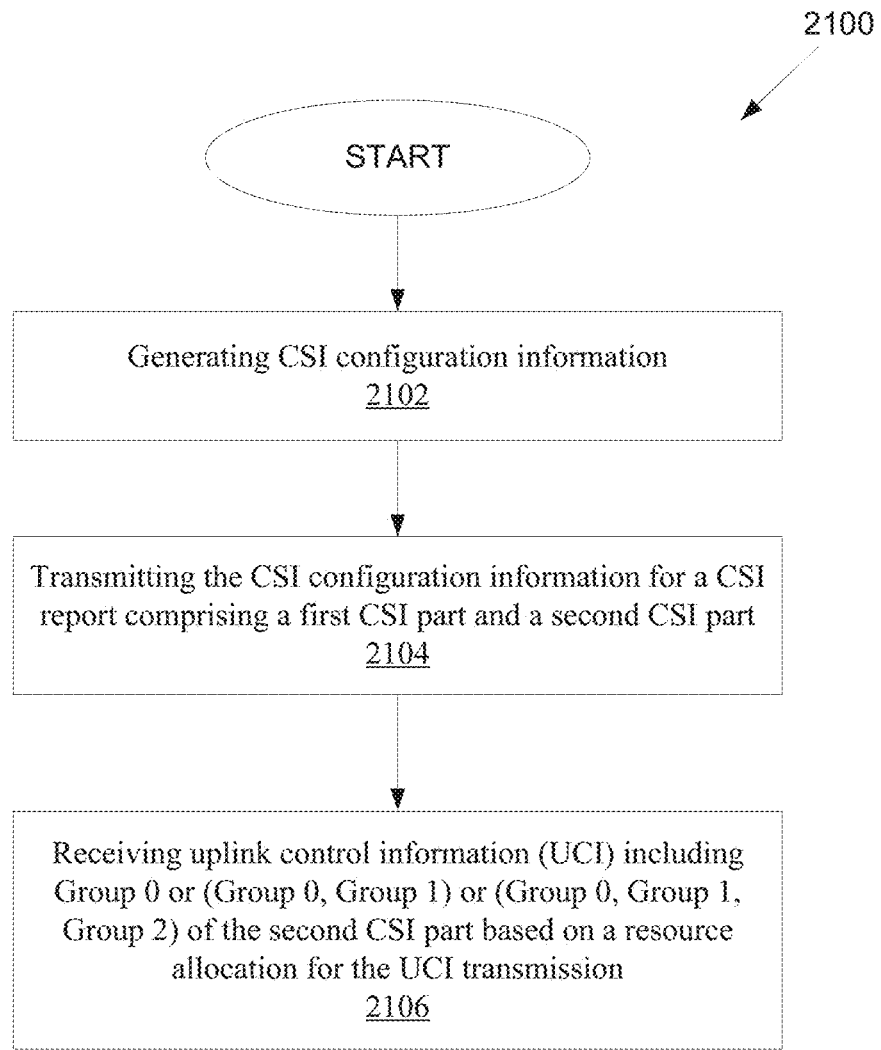
FIG. 21 illustrates a flow chart of another method for receiving an UL transmission including CSI reporting, as may be performed by a BS, according to embodiments of the present disclosure.

FIG. 21 illustrates a flow chart of another method 2100, as may be performed by a base station (BS) such as BS 102, according to embodiments of the present disclosure. The embodiment of the method 2100 illustrated in FIG. 21 is for illustration only. FIG. 21 does not limit the scope of this disclosure to any particular implementation.

As illustrated in FIG. 21, the method 2100 begins at step 2102. In step 2102, the BS (e.g., 101-103 as illustrated in FIG. 1), generates CSI configuration information.

In step 2104, the BS transmits, to a user equipment (UE), the CSI configuration information for a CSI report comprising a first CSI part and a second CSI part.

In step 2106, the BS receives, from the UE over an uplink (UL) channel, UL control information (UCI) including Group 0 or (Group 0, Group 1) or (Group 0, Group 1, Group 2) of the second CSI part based on a resource allocation for the UCI transmission.

The second CSI part includes a total of $K^{NZ}$ non-zero coefficients across $\upsilon$ layers, each non-zero coefficient having a priority value, wherein $\upsilon \geq 1$ is a rank value.

The second CSI part is partitioned into Group 0, Group 1, and Group 2 such that, based on priority values of each of the total of $K^{NZ}$ non-zero coefficients, indicators to non-zero coefficients having higher priority values are included in Group 1 and indicators to non-zero coefficients having lower priority values are included in Group 2.

An indicator to a non-zero coefficient includes an amplitude coefficient indicator and a phase coefficient indicator that indicate an amplitude and a phase of the non-zero coefficient, respectively.

A number of indicators included in Group 1 and Group 2 is $$\left\lceil \frac{K^{NZ}}{2} \right\rceil \text{ and } \left\lfloor \frac{K^{NZ}}{2} \right\rfloor,$$

respectively, where $\lceil\ \rceil$ is a ceiling function and $\lfloor\ \rfloor$ is a flooring function.

In one embodiment, $K^{NZ}=\Sigma_{l=1}^{\upsilon} K_l^{NZ}$, and for each layer l=1, ..., $\upsilon$, $K_l^{NZ}$ is a number of non-zero coefficients for layer l, the $K_l^{NZ}$ non-zero coefficients correspond to non-zero coefficients of a 2L×M coefficient matrix $C_l$ comprising 2 L rows and M columns, and the remaining 2LM-$K_l^{NZ}$ coefficients of the 2L×M coefficient matrix $C_l$ are zero, and the priority value for a coefficient $c_{l,i,m}$ of the coefficient matrix $C_l$ is determined based on layer index (l), row index (i), and column index (m) associated with the coefficient $c_{l,i,m}$.

In one embodiment, the priority value for a coefficient $c_{l,i,m}$ is given by $P(l, i, m)=2\times L\times\upsilon\times F_1(m)+\upsilon\times i+l$, wherein the coefficient $c_{l,i,m}$ with a highest priority value has a lowest associated value P(l, i, m), and $F_1$ is a fixed permutation function for index m.

In one embodiment, for each layer l=1, ..., $\upsilon$, a bit sequence comprising 2LM bits to indicate indices (i, m) of the $K_l^{NZ}$ non-zero coefficients is determined, and based on the determined priority values of the total of $K^{NZ}$ non-zero coefficients, a total of $\upsilon\times$2LM bits across $\upsilon$ layers are partitioned into a first bit sequence and a second bit sequence, wherein indicators to the first bit sequence having a higher priority are included in Group 1 and indicators to the second bit sequence having a lower priority are included in Group 2, wherein the first and second bit sequences comprise $$v \times 2LM - \left\lfloor \frac{K^{NZ}}{2} \right\rfloor$$

bits and $$\left\lfloor \frac{K^{NZ}}{2} \right\rfloor$$

bits, respectively, where $\lfloor\ \rfloor$ is a flooring function.

In one embodiment, Group 0 includes an indicator that indicates a set of L spatial domain basis vectors comprising columns of $A=[a_0\ a_1\ \ldots\ a_{L-1}]$, and for each layer l=1, ..., $\upsilon$: Group 0 includes an indicator that indicates an index $(i^*_l, m^*_l)$ of a strongest coefficient $c_{l,i_l^*,m_l^*}=1$, Group 1 includes an indicator that indicates a reference amplitude coefficient that is common for all non-zero coefficients $c_{l,i,m}$ whose index i is such that $$\left\lfloor \frac{i}{L} \right\rfloor \neq \left\lfloor \frac{i_l^*}{L} \right\rfloor,$$

where $\lfloor\ \rfloor$ is a flooring function, and Group 1 includes an indicator that indicates a set of M frequency domain (FD) basis vectors comprising columns of $B_l=[b_{l,0}\ b_{l,1}\ \ldots\ b_{l,M-1}]$.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A method performed by a user equipment (UE) in a wireless communication system, the method comprising:
   receiving, from a base station, channel state information (CSI) report configuration information;
   identifying a first CSI part and a second CSI part, wherein the second CSI part includes CSI for each of an N number of CSI reports and the CSI for each of the N number of CSI reports is partitioned into a first group, a second group, and a third group, respectively;
   determining at least one group of the second CSI part being included in uplink control information (UCI) according to CSI reporting priority, based on a resource allocation for transmission of the UCI; and
   transmitting, to the base station, the UCI including the first CSI part and the at least one determined group of the second CSI part,
   wherein the second group includes at least one indicator for indicating frequency domain basis vectors,
   wherein the CSI reporting priority corresponds to following table:

---
Priority 0: first groups for each of the N number of CSI reports
Priority 1: second group of a first CSI report
among the N number of CSI reports
Priority 2: third group of the first CSI report
among the N number of CSI reports
. . .
Priority 2N − 1: second group of a Nth CSI report
among the N number of CSI reports
Priority 2N: third group of the Nth CSI report
among the N number of CSI reports,
--- where priority 0 is a highest priority and priority 2N is a lowest priority,
   wherein at least one amplitude coefficient indicator and at least one phase coefficient indicator are included in the second group or the third group, according to a priority value P, the priority value P being associated with each of the at least one amplitude coefficient indicator and each of the at least one phase coefficient indicator, and
   wherein the priority value P corresponds to following equation:

$$P(l,i,m)=2\cdot L\cdot v\cdot F(m)+v\cdot i+l,$$

where:
l=1, ..., v,
v is a number of layers,
i=0, ..., 2L−1,
L is a number of beams,
F(m) is a predetermined function of frequency domain basis vector index m,
m=0, ..., M−1, and
M is a number of frequency domain basis vectors.

2. The method of claim 1, wherein the first group includes at least one indicator for indicating spatial domain basis vectors and a strongest coefficient indicator.

3. The method of claim 1, wherein the third group includes the at least one amplitude coefficient indicator and the at least one phase coefficient indicator with a $\lfloor N_0/2 \rfloor$ number of lowest priority, where $N_0$ is a total number of nonzero coefficients.

4. A method performed by a base station in a wireless communication system, the method comprising:
transmitting, to a user equipment (UE), channel state information (CSI) report configuration information; and
receiving, from the UE, uplink control information (UCI) including a first CSI part and at least one group of a second CSI part, corresponding to the CSI report configuration information,
wherein the at least one group of the second CSI part included in the UCI among a first group, a second group, and a third group of the second CSI part is based on a resource allocation for transmission of the UCI, according to CSI reporting priority,
wherein the second CSI part includes CSI for each of an N number of CSI reports and the CSI for each of the N number of CSI reports is partitioned into the first group, the second group, and the third group, respectively,
wherein the second group includes at least one indicator for indicating frequency domain basis vectors,
wherein the CSI reporting priority corresponds to following table:

Priority 0: first groups for each of the N number of CSI reports
Priority 1: second group of a first CSI report among the N number of CSI reports
Priority 2: third group of the first CSI report among the N number of CSI reports
. . .
Priority 2N − 1: second group of a Nth CSI report among the N number of CSI reports
Priority 2N: third group of the Nth CSI report among the N number of CSI reports, where priority 0 is a highest priority and priority 2N is a lowest priority,
wherein at least one amplitude coefficient indicator and at least one phase coefficient indicator are included in the second group or the third group, according to a priority value P, the priority value P being associated with each of the at least one amplitude coefficient indicator and each of the at least one phase coefficient indicator, and
wherein the priority value P corresponds to following equation:

$P(l,i,m)=2 \cdot L \cdot v \cdot F(m)+v \cdot i+l,$ where:
l=1, ..., v,
v is a number of layers,
i=0, ..., 2L−1,
L is a number of beams,
F(m) is a predetermined function of frequency domain basis vector index m,
m=0, ..., M−1, and
M is a number of frequency domain basis vectors.

5. The method of claim 4, wherein the first group includes at least one indicator for indicating spatial domain basis vectors and a strongest coefficient indicator.

6. The method of claim 4, wherein the third group includes the at least one amplitude coefficient indicator and the at least one phase coefficient indicator with a $\lfloor N_0/2 \rfloor$ number of lowest priority, where $N_0$ is a total number of nonzero coefficients.

7. A user equipment (UE) in a wireless communication system, the UE comprising:
a transceiver configured to receive, from a base station, channel state information (CSI) report configuration information; and
a controller coupled with the transceiver, the controller configured to:
identify a first CSI part and a second CSI part, wherein the second CSI part includes CSI for each of an N number of CSI reports and the CSI for each of the N number of CSI reports is partitioned into a first group, a second group, and a third group, respectively, and
determine at least one group of the second CSI part being included in uplink control information (UCI) according to CSI reporting priority, based on a resource allocation for transmission of the UCI,
wherein the transceiver is further configured to transmit, to the base station via the transceiver, the UCI including the first CSI part and the at least one determined group of the second CSI part,
wherein the second group includes at least one indicator for indicating frequency domain basis vectors,
wherein the CSI reporting priority corresponds to following table:

Priority 0: first groups for each of the N number of CSI reports
Priority 1: second group of a first CSI report among the N number of CSI reports
Priority 2: third group of the first CSI report among the N number of CSI reports
. . .
Priority 2N − 1: second group of a Nth CSI report among the N number of CSI reports
Priority 2N: third group of the Nth CSI report among the N number of CSI reports, where priority 0 is a highest priority and priority 2N is a lowest priority,
wherein at least one amplitude coefficient indicator and at least one phase coefficient indicator are included in the second group or the third group, according to a priority value P, the priority value P being associated with each of the at least one amplitude coefficient indicator and each of the at least one phase coefficient indicator, and
wherein the priority value P corresponds to following equation:

$P(l,i,m)=2 \cdot L \cdot v \cdot F(m)+v \cdot i+l,$ where:
l=1, ..., v,
v is a number of layers,
i=0, ..., 2L−1,
L is a number of beams,
F(m) is a predetermined function of frequency domain basis vector index m,
m=0, ..., M−1, and
M is a number of frequency domain basis vectors.

8. The UE of claim 7, wherein the first group includes at least one indicator for indicating spatial domain basis vectors and a strongest coefficient indicator.

9. The UE of claim 7, wherein the third group includes the at least one amplitude coefficient indicator and the at least one phase coefficient indicator with a $\lfloor N_0/2 \rfloor$ number of lowest priority, where $N_0$ is a total number of nonzero coefficients.

10. A base station in a wireless communication system, the base station comprising:
a transceiver configured to:
transmit, to a user equipment (UE), channel state information (CSI) report configuration information; and
receive, from the UE via the transceiver, uplink control information (UCI) including a first CSI part and at least one group of a second CSI part, corresponding to the CSI report configuration information,
wherein the at least one group of the second CSI part included in the UCI among a first group, a second group, and a third group of the second CSI part is based on a resource allocation for transmission of the UCI, according to CSI reporting priority,
wherein the second CSI part includes CSI for each of an N number of CSI reports and the CSI for each of the N number of CSI reports is partitioned into the first group, the second group, and the third group, respectively,
wherein the second group includes at least one indicator for indicating frequency domain basis vectors,
wherein the CSI reporting priority corresponds to following table:

Priority 0: first groups for each of the N number of CSI reports
Priority 1: second group of a first CSI report
among the N number of CSI reports
Priority 2: third group of the first CSI report
among the N number of CSI reports
. . .
Priority 2N − 1: second group of a Nth CSI report
among the N number of CSI reports
Priority 2N: third group of the Nth CSI report
among the N number of CSI reports, where priority 0 is a highest priority and priority 2N is a lowest priority,
wherein at least one amplitude coefficient indicator and at least one phase coefficient indicator are included in the second group or the third group, according to a priority value P, the priority value P being associated with each of the at least one amplitude coefficient indicator and each of the at least one phase coefficient indicator, and
wherein the priority value P corresponds to following equation:

$P(l,i,m) = 2 \cdot L \cdot v \cdot F(m) + v \cdot i + l$, where:
l=1, . . . , v,
v is a number of layers,
i=0, . . . , 2L−1,
L is a number of beams,
F(m) is a predetermined function of frequency domain basis vector index m,
m=0, . . . , M−1, and
M is a number of frequency domain basis vectors.

11. The base station of claim 10, wherein the first group includes at least one indicator for indicating spatial domain basis vectors and a strongest coefficient indicator.

12. The base station of claim 10, wherein the third group includes the at least one amplitude coefficient indicator and the at least one phase coefficient indicator with a $\lfloor N_0/2 \rfloor$ number of lowest priority, where $N_0$ is a total number of nonzero coefficients.

* * * * *